United States Patent
Hoff et al.

(10) Patent No.: US 9,346,509 B2
(45) Date of Patent: May 24, 2016

(54) BROAD VIEW MIRROR FOR A CYCLE VEHICLE

(71) Applicant: Old School Products LLC, Allyn, WA (US)

(72) Inventors: Vance A. Hoff, Grapeview, WA (US); Phillip G. Larson, Tahuya, WA (US); Perry D. Hoff, Grapeview, WA (US); Mark A. Hoff, Belfair, WA (US)

(73) Assignee: Old School Products LLC, Allyn, WA (US)

( * ) Notice: Subject to any disclaimer, the term of this patent is extended or adjusted under 35 U.S.C. 154(b) by 0 days.

(21) Appl. No.: 14/720,926

(22) Filed: May 25, 2015

(65) Prior Publication Data

US 2015/0251718 A1    Sep. 10, 2015

Related U.S. Application Data

(63) Continuation-in-part of application No. 13/872,582, filed on Apr. 29, 2013, now Pat. No. 9,039,211, which is a continuation-in-part of application No. 29/453,401, filed on Apr. 29, 2013, now Pat. No. Des. 719,070, and a continuation-in-part of application No. 29/453,403, filed on Apr. 29, 2013, now Pat. No. Des. 719,490.

(60) Provisional application No. 61/639,511, filed on Apr. 27, 2012.

(51) Int. Cl.
G02B 7/198    (2006.01)
B62J 29/00    (2006.01)

(52) U.S. Cl.
CPC .................................. *B62J 29/00* (2013.01)

(58) Field of Classification Search
CPC combination set(s) only.
See application file for complete search history.

(56) References Cited

U.S. PATENT DOCUMENTS

2010/0188764 A1*   7/2010   Wu .......................... B62J 29/00
                                                                359/872

\* cited by examiner

*Primary Examiner* — Joseph P Martinez
(74) *Attorney, Agent, or Firm* — Puget Patent; Michael Gibbons

(57) ABSTRACT

A mirror assembly for mounting to a handlebar of a motorcycle or other cycle vehicle, including a handle enabling an operator of the motorcycle to rotate the mirror without requiring the operator to remove a hand from the handlebar. The rotation swivels the mirror from a view to the rear to a position with a view to the side. Upon releasing the handle, a compression spring within the assembly returns the mirror to its original position. The mounting arrangement for the assembly includes two portions rotatable perpendicularly to one another, permitting the mirror arrangement to be adjusted after coupling with the handlebar such that the stem of the mirror is plumb. This ensures that when the handle is engaged rotating the mirror, the orientation of the mirror is maintained such that the top edge of the mirror remains level during rotation and that the mirror stem remains plumb.

20 Claims, 19 Drawing Sheets

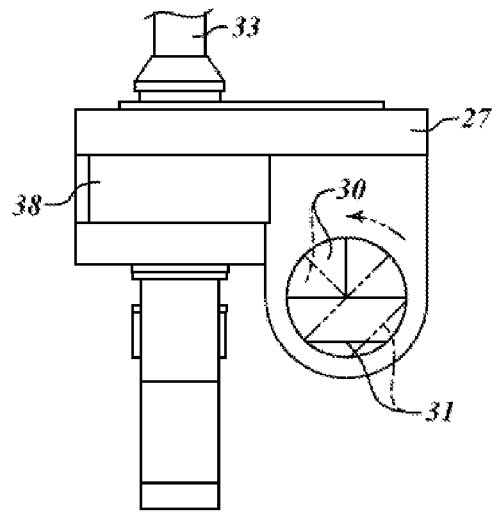
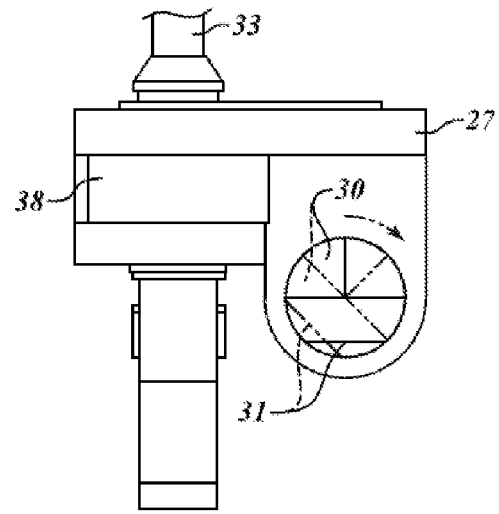
*FIG.9*    *FIG.10*
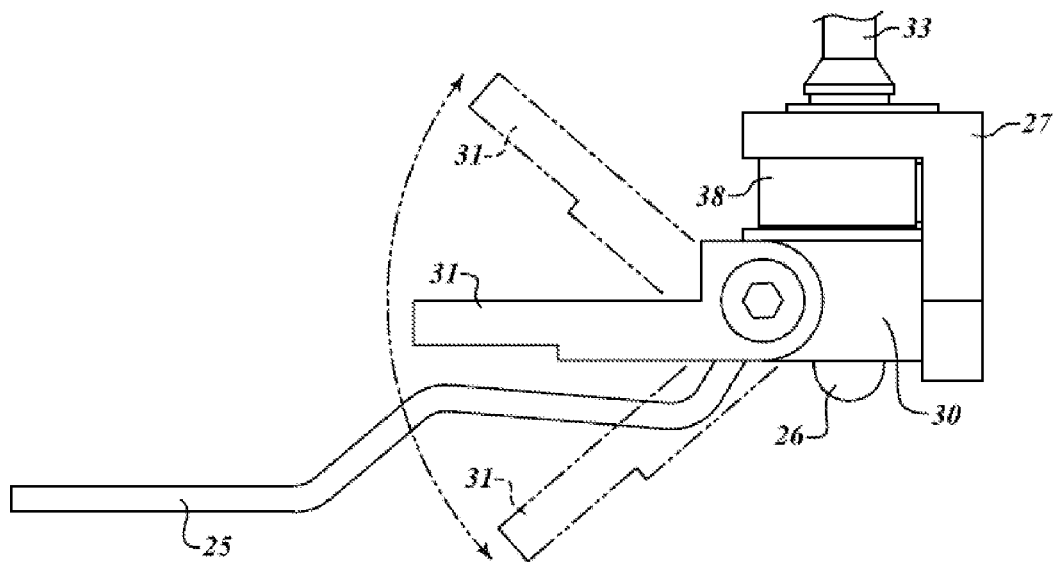
*FIG.11*

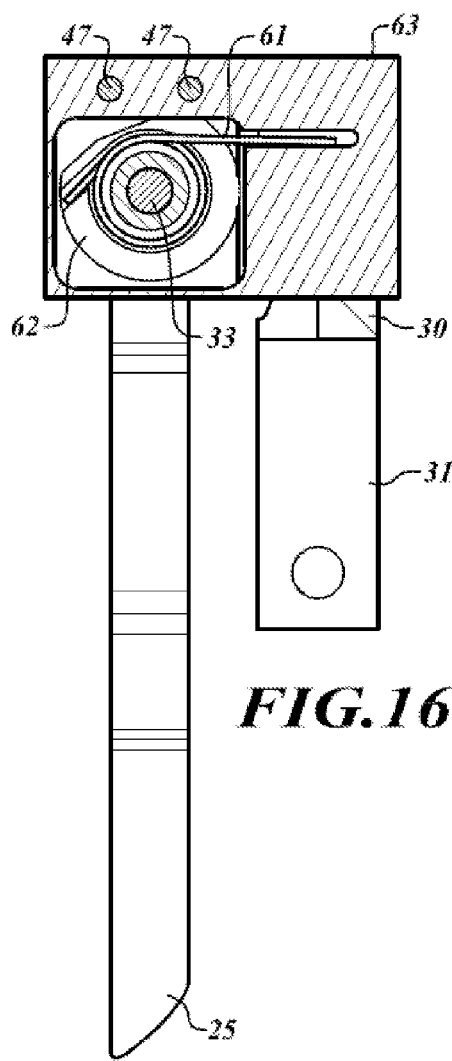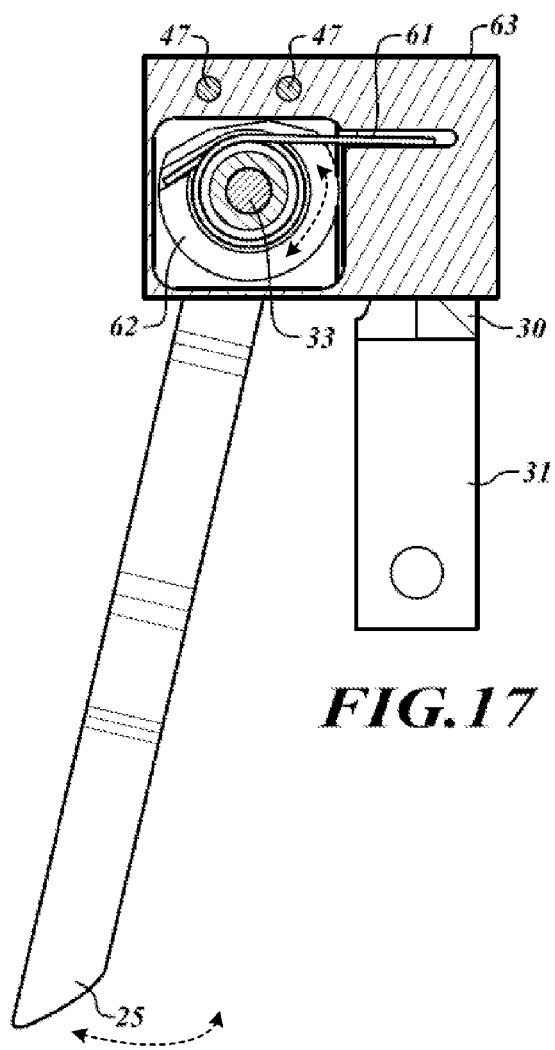

BROAD VIEW MIRROR FOR A CYCLE VEHICLE

PRIORITY CLAIM

This application constitutes a continuation-in-part of U.S. patent application Ser. No. 13/872,582, titled "BROAD VIEW MIRROR FOR A CYCLE VEHICLE," naming Vance A. Hoff, Phillip G. Larson. Perry D. Hoff and Mark R. Hoff as inventors, filed Apr. 29, 2013 and scheduled to issue on May 26, 2015 as U.S. Pat. No. 9,039,211 (our ref. OLDS-1-1003-1); the foregoing parent application being a non-provisional application of U.S. Provisional Patent Application No. 61/639,511, titled "Wide View Mirror Mount for Motorcycles," naming Vance Hoff, Perry Hoff, Mark Hoff, and Phil Larson as inventors, filed Apr. 27, 2012; the instant application also constitutes a continuation-in-part of U.S. patent application Ser. No. 29/453,401, titled "MIRROR ROTATION CONTROL FOR A CYCLE VEHICLE," naming Vance A. Hoff, Phillip G. Larson. Perry D. Hoff and Mark R. Hoff as inventors, filed Apr. 29, 2013 and issued Dec. 9, 2014 as U.S. Design Pat. No. D719,070 (our ref. OLDS-1-1004-1); the instant application also constitutes a continuation-in-part of U.S. patent application Ser. No. 29/453,403, titled "MIRROR ROTATION MOUNT FOR A CYCLE VEHICLE," naming Vance A. Hoff, Phillip G. Larson. Perry D. Hoff and Mark R. Hoff as inventors, filed Apr. 29, 2013 and issued Dec. 16, 2014 as U.S. Design Pat. No. D719,490 (our ref. OLDS-1-1005-1). The foregoing applications are hereby incorporated by reference in their entirety as if fully set forth herein.

FIELD OF THE INVENTION

This invention relates generally to cycle vehicles, and more specifically, to a broad view mirror for a cycle vehicle.

BACKGROUND

When operating a cycle vehicle, such as a motorcycle, moped, scooter, dirt bike, bicycle or other wheeled vehicle having a handlebar for steering, a view both in front and behind the operator is essential for safety. Motorcycles, for example, may be delivered from the factory with mirrors facilitating a view to the rear. These mirrors, one for the left side and one for the right side, may be mounted on mirror stems, with the mirror stems affixed to the handlebar to the left and right of the rider.

The coupling of the mirror stem with the handlebar may entail a channel through the handlebar, or through another control affixed to the handlebar (such as a brake or clutch lever assembly), into which the mirror stem is inserted. The bottom portion of the mirror stem may be threaded such that the mirror may be fixed in place, once the stem is passed through the channel, using an acorn nut or other similar fastener on the underside of the handlebar. The nut is tightened over the threaded portion of the mirror stem until the mirror stem is fixed in place relative to the handlebar.

The mirror itself is typically fixed to the mirror stem using a ball and socket arrangement, which facilitates hand-adjustment of the mirror by the operator of the vehicle to provide the best view behind the vehicle. The mirrors may be small, in order to not obstruct the forward view or add weight or bulk to the handlebar. Consequently, the view to the rear provided by the mirrors may not provide a complete picture. Particularly, while in one position the mirror may facilitate a view directly behind the vehicle, a blind spot to the side may exist. The operator may adjust the mirror to show the blind spot, but while riding this requires removing a hand from the handlebar. Further, adjusting the mirror while riding diverts attention from the operator's primary task of driving. Finally, once the mirror shows the blind spot, the view to the rear is taken away, requiring another hand adjustment to return the mirror to its approximate original view (and another diversion from driving).

U.S. Pat. No. 7,837,339, titled "Open Vehicle Rearview Mirror System for Switching Between Normal and Blind-Spot Views," issued to Sakamoto on Nov. 23, 2010, proposes a rear view system for a motorcycle in which the rider may actuate an electrically-driven motor and circuitry arrangement to rotate the mirrors to provide an additional view. Sakamoto, however, requires connection to the motorcycle's electrical system or requires an additional battery be installed, adding weight to the vehicle. The electric motor and circuitry arrangement adds undue complexity and expense to the cost of the vehicle, and the system is best provided from the factory with mirrors and adjusting relays integrated in housings matched with the fairing of the vehicle. While Sakamoto is ambiguous regarding after-market application of the invention, it is unlikely that such an installation would be practical given the required fairing modifications, connections to the electrical system and/or heavy relays behind the mirror that would not be supported by a simple mirror stem.

What is needed, then, is a mirror design for a cycle vehicle, such as a motorcycle, bicycle and the like, whereby once the mirror is adjusted for a rear view, an operator may view the blind spot temporarily while riding without unduly jeopardizing operator safety. Further, when the operator is done looking to the blind spot, the mirror should return by itself to its original position showing the view to the rear. The design should be able to be installed on a motorcycle once delivered from the factory as an after-market option, and require no complex circuitry, no integration with the vehicle's electrical system, no undue change in weight or balance of the vehicle, and be constructed inexpensively. Such a design would permit the broadest cross-section of riders to benefit from a low-cost, after-market solution that enhances motorcycle safety.

Accordingly, what is disclosed is a broad view mirror for a cycle vehicle.

SUMMARY

Embodiments involving a broad view mirror for a cycle vehicle may take different forms. An exemplary system for a broad view mirror for a cycle vehicle may include a main frame; a bearing cap; a spring carrier arrangement, the spring carrier arrangement disposed between the main frame and bearing cap, the spring carrier arrangement including at least a compression spring for engaging and tensionally biasing the spring carrier relative to the main frame; a frame mounting bracket; a handlebar mounting bracket; a mirror including at least a mirror stem, the mirror stem including at least a portion of the mirror stem disposed through the main frame, bearing cap and spring carrier arrangement; and a handle, the handle fixedly coupled with the mirror stem.

Additional possible system features may include the mirror stem threaded through the main frame, the spring carrier arrangement, the bearing cap and the handle. Additional possible system features may include the spring carrier arrangement including at least a spring carrier; a compression spring at least partially disposed within the spring carrier; a spring bushing, the spring bushing including at least: a shaft of the spring bushing, the shaft of the spring bushing disposed within the compression spring, wherein a face of the spring bushing opposite the compression spring engages a portion of the main frame. Additional possible system features may include the spring carrier arrangement including at least an upper bearing, the upper bearing received by the main frame; a lower bearing, the lower bearing received by the bearing cap; and a lower bushing, the lower bushing received by the bearing cap and disposed between the bearing cap and the handle.

Additional possible system features may include at least a mirror stem threading arrangement including at least the mirror stem threaded through an upper spacer, the main frame, the upper bearing, the spring carrier, the lower bearing, the lower bushing, the bearing cap and the handle, a portion of the mirror stem further threaded into a mirror stem lock nut. Additional possible system features may include at least a gap between the main frame and bearing cap defining a receptacle for the spring carrier, wherein a height of the spring carrier is shorter than the height of the gap, and wherein at least two threaded fasteners couple the main frame and bearing cap. Additional possible system features may include at least the spring carrier rotatable about an axis of the mirror stem in between the main frame and bearing cap. Additional possible system features may include at least a limit of rotation defined by a portion of the spring carrier engaging a portion of the main frame. Additional possible system features may include at least the compression spring biasing the portion of the spring carrier to engage the portion of the main frame, the engaged position defining a home position for the mirror stem.

Additional possible system features may include the mirror stem threading arrangement permitting an engagement of the handle to rotate the mirror stem against the tensional bias of the compression spring to a second position for the mirror stem, the second position defined by a second portion of the spring carrier engaging a second portion of the main frame, and wherein the handle being released permits the tensional bias of the compression spring to return the mirror stem to the home position for the mirror stem. Additional possible system features may include a receptacle of the bearing cap for receiving the lower bushing and lower bearing has a first height, and wherein the lower bushing has at least two diameters including at least a first diameter of the lower bushing which fits within the lower bearing, and wherein at least a portion of a second diameter of the lower bushing protrudes through the receptacle and below the bearing cap.

Additional possible system features may include the frame mounting bracket rotatably coupled with the main frame. Additional possible system features may include the handlebar mounting bracket rotatably coupled with the frame mounting bracket, the handlebar mounting bracket including at least a channel for receiving a threaded fastener for coupling the handlebar mounting bracket with a handlebar of a cycle vehicle. Additional possible system features may include a frame mount axis about which the frame mounting bracket rotates is orthogonal to a handlebar mount axis about which the handlebar mounting bracket rotates. Additional possible system features may include a frame threaded fastener facilitating the rotation of the frame mounting bracket relative to the main frame, and wherein a mounting threaded fastener facilitates the rotation of the handlebar mounting bracket relative to the frame mounting bracket.

Additional possible system features may include the rotation of the frame mounting bracket and rotation of the handlebar mounting bracket configurable to maintain the mirror stem in a plumb position. Additional possible system features may include the rotation of the frame mounting bracket and rotation of the handlebar mounting bracket ensure the plumb position is maintained during engagement of the handle and rotation of the mirror stem. Additional possible system features may include the broad view mirror coupled to a handlebar of the cycle vehicle via a bolt through a channel in the handlebar configured for receiving an original-equipment mirror stem.

Another exemplary system for a broad view mirror for a cycle vehicle may include a frame arrangement configured for receiving a mirror stem of a mirror; a spring carrier arrangement enabling the mirror to rotate responsive to an engagement of a handle coupled with the mirror stem and spring carrier arrangement, the spring carrier arrangement enabling the mirror to return to a home position when the handle is disengaged; and a mounting bracket arrangement enabling the mirror stem to maintain a plumb orientation when the handle is engaged.

An exemplary method for using a broad view mirror for a cycle vehicle may include at least providing a broad view mirror for a cycle vehicle, the broad view mirror including at least a frame mounting bracket and a handlebar mounting bracket; passing a threaded portion of a mirror stem through a main frame, a spring carrier arrangement, a bearing cap and a handle of the broad view mirror; rotatably threading at least two fasteners through the bearing cap and into the main frame, fixedly coupling the bearing cap and main frame; rotatably threading a fastener onto the threaded portion of the mirror stem, fixedly coupling the mirror stem, handle and spring carrier arrangement; affixing the handlebar mounting bracket to a handlebar of the cycle vehicle; orienting the frame mounting bracket and handlebar mounting bracket relative to one another and to the handlebar of the cycle vehicle to orient the mirror stem in a plumb position; receiving an engagement of the handle, the engagement of the handle rotating the mirror stem within the main frame and bearing cap from a first position to the second position, the orientation of the mounting brackets maintaining the mirror stem in a plumb position during rotation, the rotation of the mirror stem providing an operator of the cycle vehicle with a different mirror view via a mirror fixedly coupled to the mirror stem; and returning the mirror stem to the first position from the second position upon the handle being disengaged, the returning the mirror via a compression spring of the spring carrier arrangement tensionally biased against a portion of the main frame, the returning the mirror stem providing the operator of the cycle vehicle with an original mirror view via the mirror fixedly coupled to the mirror stem.

In addition to the foregoing, various other system and method embodiments are set forth and described in the teachings such as the text (e.g., claims, drawings and/or the detailed description) and/or drawings of the present disclosure.

The foregoing is a summary and thus contains, by necessity, simplifications, generalizations and omissions of detail; consequently, those skilled in the art will appreciate that the summary is illustrative only and is NOT intended to be in any way limiting. Other aspects, embodiments, features and advantages of the device and/or other subject matter described herein will become apparent in the teachings set forth herein.

BRIEF DESCRIPTION OF THE DRAWINGS

Certain embodiments of the present invention are described in detail below with reference to the following drawings:

FIGS. 9 and 10 are rear plan views of a broad view mirror for a cycle vehicle, in accordance with an embodiment of the invention;

FIG. 11 is a side plan view of a broad view mirror for a cycle vehicle, in accordance with an embodiment of the invention;

FIGS. 16 and 17 are top cross-sectional views of a section of a broad view mirror for a cycle vehicle, in accordance with an embodiment of the invention;

DETAILED DESCRIPTION

This invention relates generally to cycle vehicles, and more specifically, to a broad view mirror for a cycle vehicle. Specific details of certain embodiments of the invention are set forth in the following description and in FIGS. 1-25 to provide a thorough understanding of such embodiments. The present invention may have additional embodiments, may be practiced without one or more of the details described for any particular described embodiment, or may have any detail described for one particular embodiment practiced with any other detail described for another embodiment.

Importantly, a grouping of inventive aspects in any particular "embodiment" within this detailed description, and/or a grouping of limitations in the claims presented herein, is not intended to be a limiting disclosure of those particular aspects and/or limitations to that particular embodiment and/or claim. The inventive entity presenting this disclosure fully intends that any disclosed aspect of any embodiment in the detailed description and/or any claim limitation ever presented relative to the instant disclosure and/or any continuing application claiming priority from the instant application (e.g. continuation, continuation-in-part, and/or divisional applications) may be practiced with any other disclosed aspect of any embodiment in the detailed description and/or any claim limitation. Claimed combinations which draw from different embodiments and/or originally-presented claims are fully within the possession of the inventive entity at the time the instant disclosure is being filed. Any future claim comprising any combination of limitations, each such limitation being herein disclosed and therefore having support in the original claims or in the specification as originally filed (or that of any continuing application claiming priority from the instant application), is possessed by the inventive entity at present irrespective of whether such combination is described in the instant specification because all such combinations are viewed by the inventive entity as currently operable without undue experimentation given the disclosure herein and therefore that any such future claim would not represent new matter.

Figure 1:
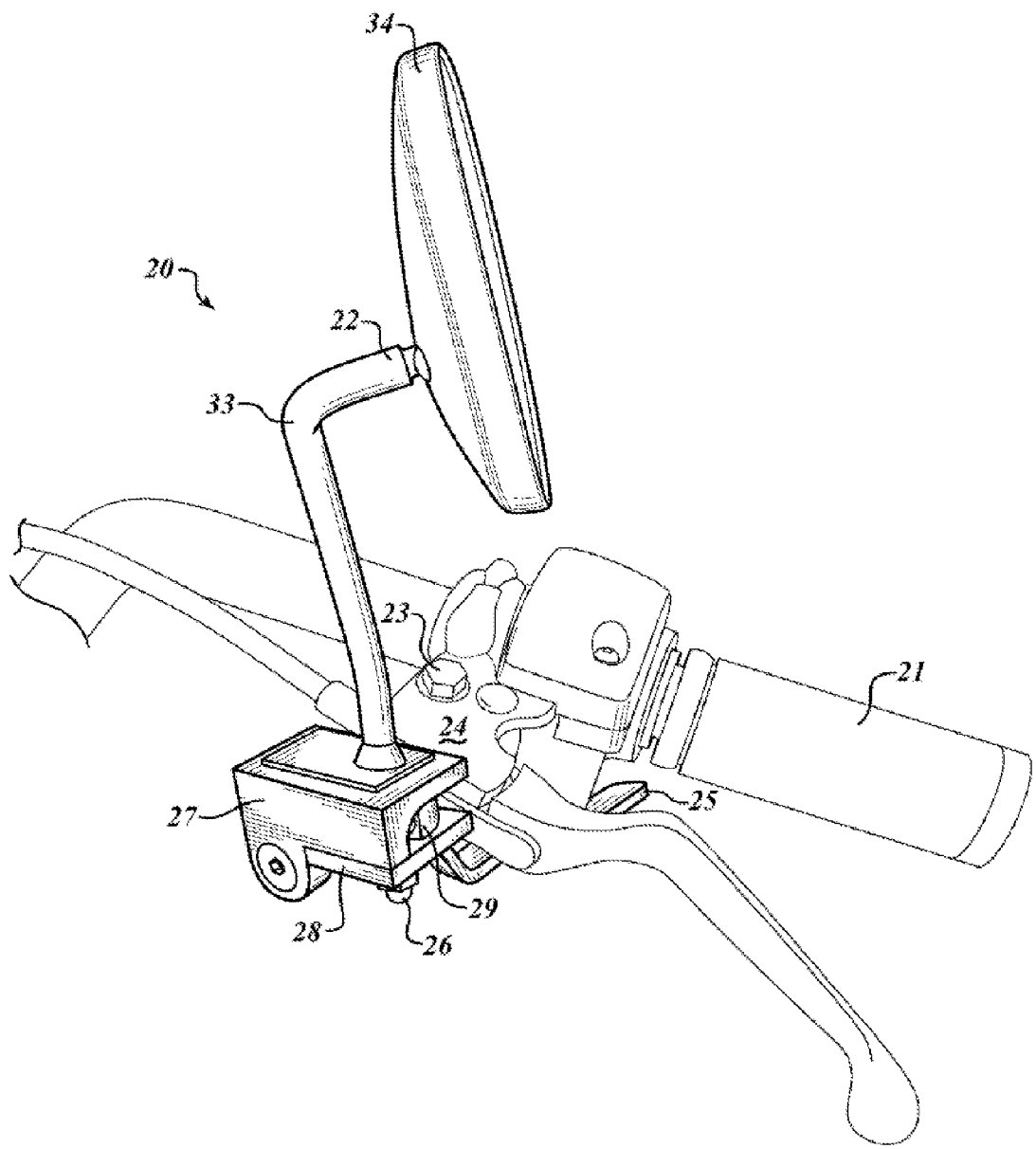
FIG. 1 is an isometric view of a broad view mirror for a cycle vehicle installed on a handlebar, in accordance with an embodiment of the invention.
Figure 2:
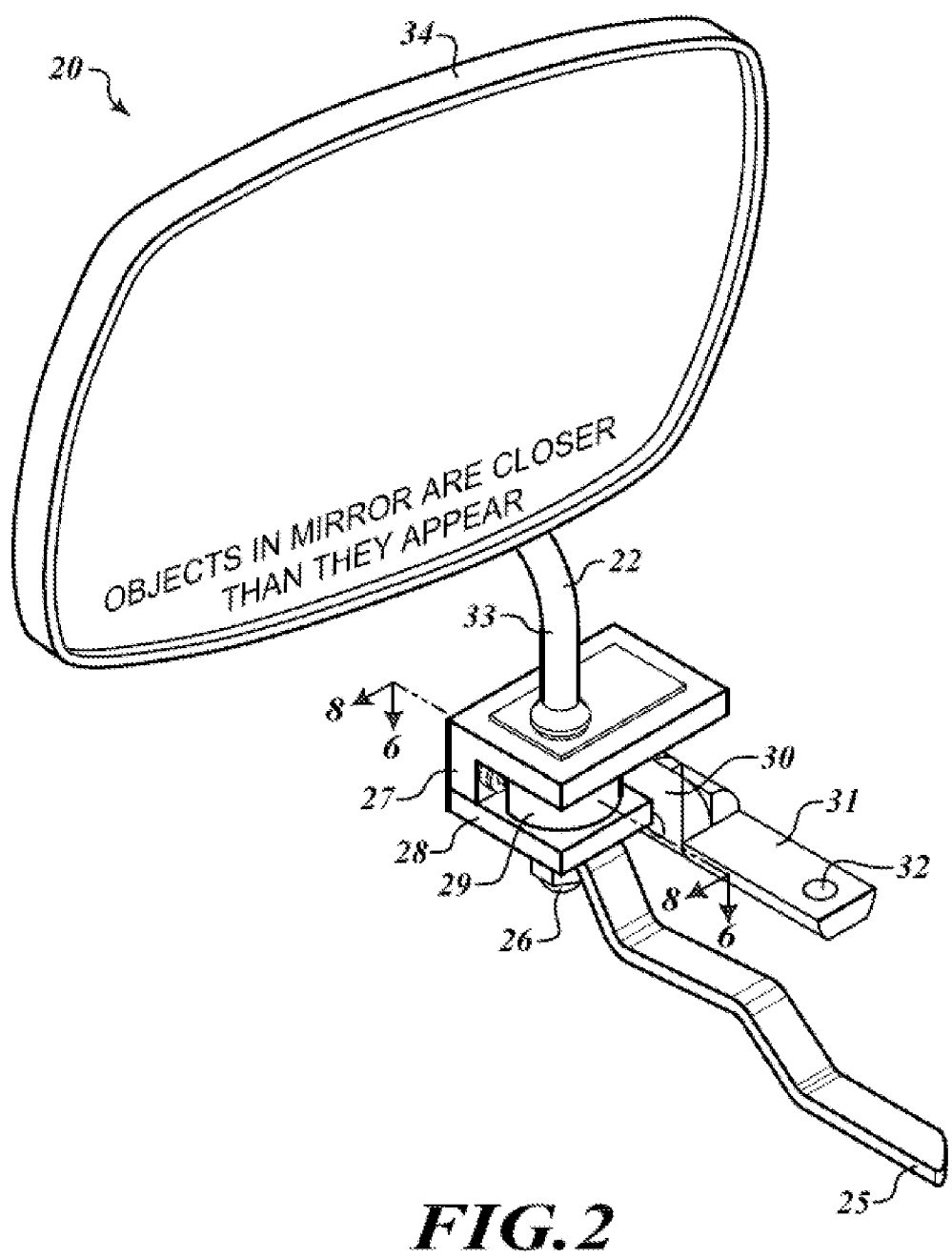
FIG. 2 is an isometric view of a broad view mirror for a cycle vehicle, in accordance with an embodiment of the invention.
Figure 3:
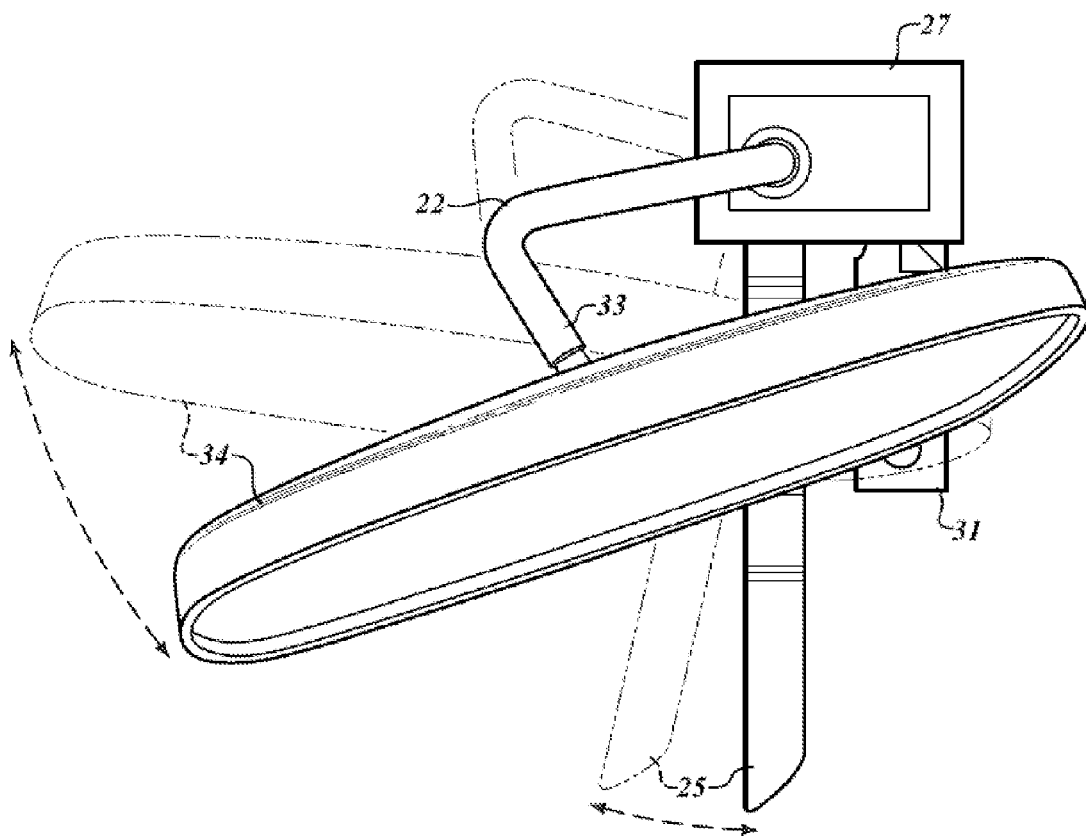
FIG. 3 is a top plan view of a broad view mirror for a cycle vehicle, in accordance with an embodiment of the invention.

FIG. 1 is an isometric view of a broad view mirror for a cycle vehicle installed on a handlebar, in accordance with an embodiment of the invention. FIGS. 2 and 3 are an isometric view and a top plan view of a broad view mirror for a cycle vehicle, in accordance with an embodiment of the invention. A cycle vehicle may be any vehicle in which steering is controlled with a handlebar, including a motorcycle, moped, scooter, dirt bike, bicycle or other wheeled vehicle having a handlebar for steering. For brevity, the remainder of the instant disclosure will use the term motorcycle to mean a cycle vehicle.

In some embodiments, the broad view mirror 20 for a cycle vehicle includes a main frame 27, a bearing cap 28, a spring carrier arrangement 29, a frame mounting bracket 30, a handlebar mounting bracket 31, a mirror arrangement 22 including a mirror 34 and mirror stem 33, and a handle 25.

In some embodiments, a broad view mirror (BVM) 20 may include an arrangement 22 of a mirror and mirror stem. In different embodiments, the invention may include the BVM parts (main frame, bearing cap, etc.) other than the arrangement of the mirror and mirror stem, whereby the mirror and mirror stem included with the motorcycle from the factory is attached to the invention during installation of the BVM. As depicted in the top plan view of FIG. 3, the arrangement of the mirror and mirror stem of the broad view mirror is rotatable by an operator of the motorcycle using the handle 25 of the broad view mirror. The rotation of the mirror and mirror stem may facilitate, for example, the operator of the motorcycle viewing a larger portion of the scene to the side of the motorcycle, including a blind spot. Further, as seen in FIG. 1, the handle 25 is positioned such that the operator may operate the handle to rotate the BVM from a first position (a home position) to a second position without removing a hand from the handlebar 21, for safer operation of the motorcycle. Once the rider releases the handle 25, the mirror and mirror stem return to their original position via the spring carrier arrangement 29, the spring carrier arrangement being disposed between the main frame and bearing cap and including a compression spring tensionally biasing the spring carrier arrangement against the main frame and returning the BVM to the first position. The spring carrier arrangement including a compression spring may thus be called a compression spring carrier arrangement. (A torsion spring carrier arrangement is disclosed elsewhere herein.)

In some embodiments, a broad view mirror 20 may be installed on a control of the motorcycle mounted to the handlebar 21. For example, the motorcycle may be delivered from the factory with a mirror arrangement coupled with the clutch lever assembly 24, the lever positioned on the left side of the handlebar. The mirror stem of the factory mirror arrangement may have a threaded portion opposite the mirror side of the stem, with the threaded portion being inserted in a channel through the mounting bracket of the clutch lever assembly. Once the stem is passed through the channel at the factory, an acorn nut or other similar fastener is tightened over the threaded portion of the mirror stem until the mirror stem is fixed in place relative to the handlebar and clutch lever assembly. The factory motorcycle may include a second mirror arrangement on the right side of the motorcycle handlebar, in which the mirror stem may be disposed through a channel in the front brake lever assembly coupled with the right side of the handlebar.

Installing the broad view mirror 20 on a factory motorcycle entails removing the factory mirror arrangement 22 (the mirror and mirror stem) from the clutch and/or front brake lever assembly. In some embodiments, the mirror arrangement may then be coupled with the remainder of the broad view mirror 20 as described elsewhere herein. In different embodiments, the broad view mirror is provided with its own mirror arrangement, and the original, factory mirror arrangement is not utilized. A bolt 23 or other threaded fastener may be inserted through the channel in the lever assembly from whence the mirror arrangement came, the bolt being long enough to extend past the underside of the assembly. A mounting arrangement of the broad view mirror is threaded over the bolt and held against the underside of the lever assembly. Particularly, the handlebar mounting bracket 31 includes a handlebar mount channel 32 disposed through the bracket. The bolt passes through the handlebar mount channel, with a nut securing the mounting arrangement to the underside of the lever assembly.

The position of the main frame 27 may then be oriented relative to the handlebar to which the BVM is mounted via adjustments to the handlebar mounting bracket 31 and frame mounting bracket 30. As will be discussed further, the handlebar mounting bracket is rotatably coupled to the frame mounting bracket and the frame mounting bracket is rotatably coupled to the main frame. The two rotatable couplings of the mounting brackets are orthogonal to one another, ensuring that the BVM may be adjusted and/or oriented following coupling with the handlebar so that the mirror stem is in a plumb orientation. Beneficially, if the mirror stem is plumb during installation, it will remain so when the handle 25 is engaged rotating the mirror. Correct orientation of the BVM ensures that when the handle is engaged, the resulting rotation of the mirror stem will not rotate the mirror out of the field of view of the operator of the motorcycle.

While FIG. 1 depicts the broad view mirror installed on the clutch lever assembly 24 on the left side of the motorcycle, and FIGS. 2 and 3 depict a left side version of the BVM, the operation of installing a broad view mirror on the right side of the motorcycle via the front brake lever assembly is essentially the same. Portions of the broad view mirror are provided in reverse configurations to reflect their installation on the left or right side of the motorcycle, as will be described elsewhere herein. (In other words, there is a left side version of the broad view mirror and a right side version of the broad view mirror, and while only one side may be depicted and/or described herein, the teachings of the instant disclosure are intended to apply equally to BVM versions for either side of the cycle vehicle.)

Figure 4:
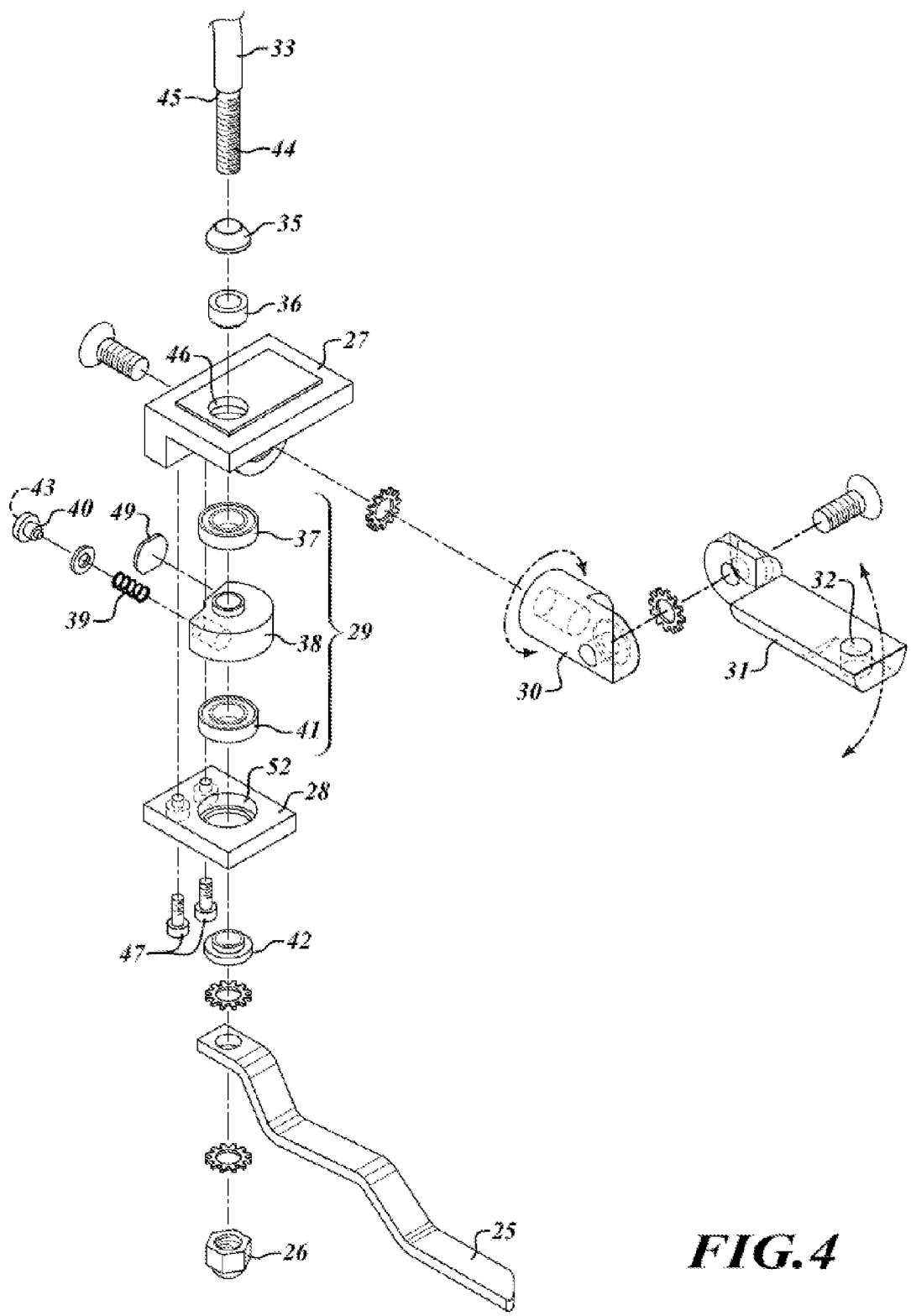
FIG. 4 is an exploded isometric view of a broad view mirror for a cycle vehicle, in accordance with an embodiment of the invention.
Figure 5:
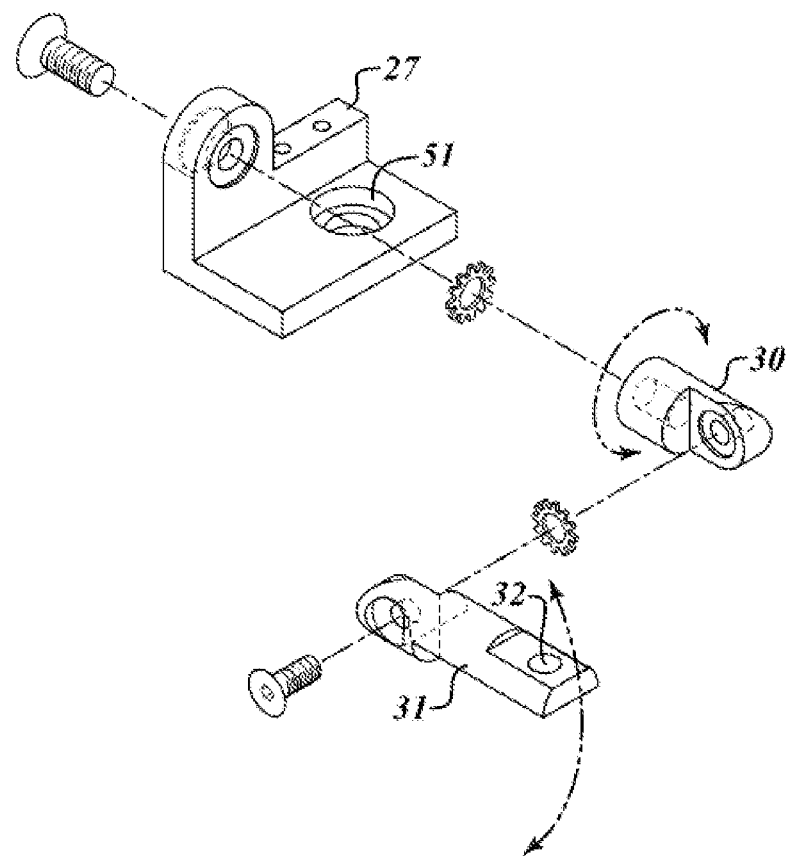
FIG. 5 is an exploded isometric view of a mounting arrangement of a broad view mirror for a cycle vehicle, in accordance with an embodiment of the invention.
Figure 8:
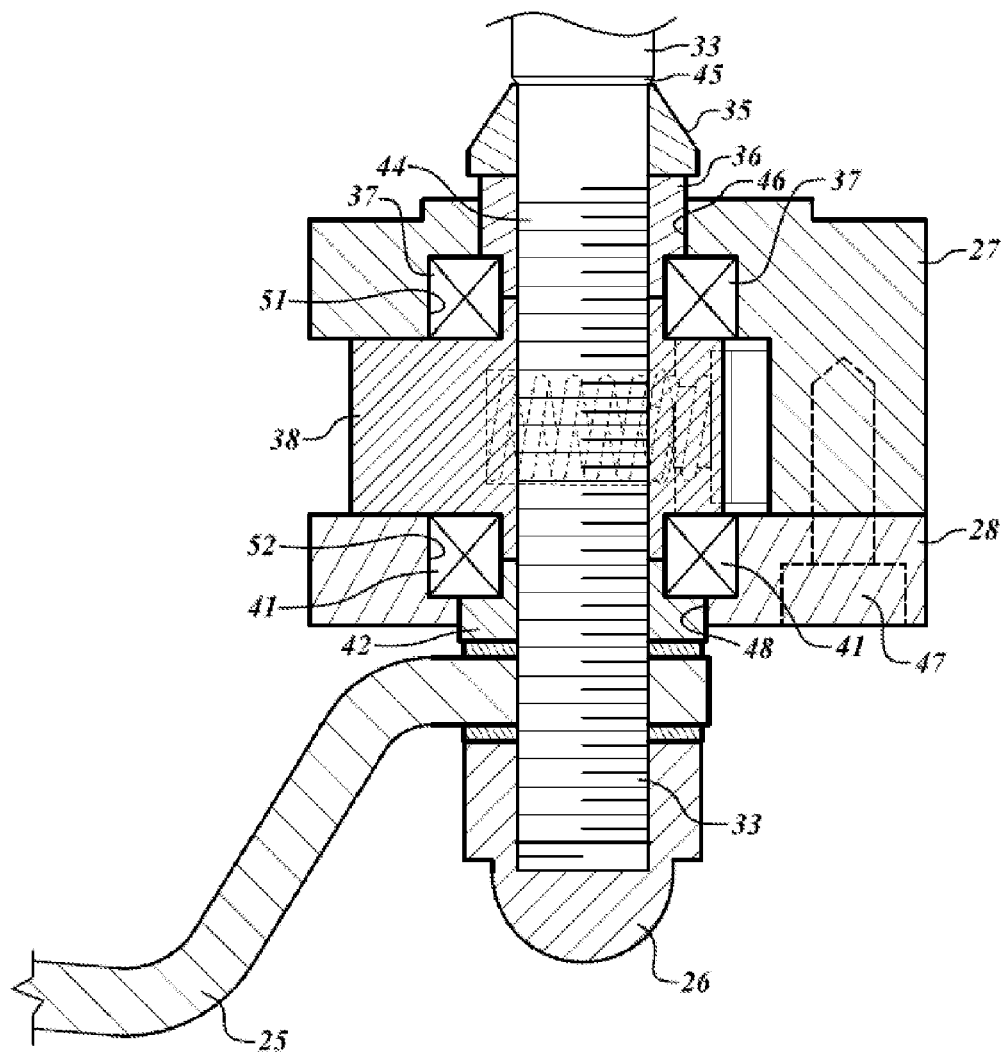
FIG. 8 is a side cross-sectional view of a different section of a broad view mirror for a cycle vehicle, in accordance with an embodiment of the invention.

FIG. 4 is an exploded isometric view of a broad view mirror for a cycle vehicle, in accordance with an embodiment of the invention. FIG. 5 is an exploded isometric view of the mounting arrangement of a broad view mirror for a cycle vehicle, in accordance with an embodiment of the invention. FIG. 8 is a side cross-sectional view of a section of a broad view mirror for a cycle vehicle, in accordance with an embodiment of the invention. In some embodiments, the broad view mirror 20 is configured to permit the mirror stem 33 to rotate relative to the main frame 27 and bearing cap 28. The rotation is facilitated by an arrangement of the mirror stem threading through the main frame, bearing cap and a series of bearings, spring carrier, star washers, spacers, a bushing and a fastener, but leaving room between the mirror stem and the channels through the main frame and bearing cap.

Particularly, an upper spacer 35 and an upper collar 36 are slipped over the mirror stem 33 and passed beyond the threaded portion 44 of the mirror stem. A lip 45 of the mirror stem limits the travel of the upper spacer along the mirror stem. The upper collar is configured to loosely fit within a collar cavity 46 in the top face of the main frame 27. The upper collar may have two diameters and the collar cavity may have a two-level design also featuring two diameters. The smaller diameter of the upper collar fits inside the smaller diameter of the collar cavity, with the larger diameter of the upper collar resting on a shelf of the collar cavity formed by the change in diameters. The foregoing arrangement of the upper spacer against the lip of the mirror stem, the upper collar underneath the upper spacer, and the upper collar resting within the collar cavity of the main frame serves to limit the travel of the mirror stem within the main frame and remainder of the BVM.

Once the mirror stem 33 is passed through the upper spacer 35, upper collar 36 and main frame 27, it next passes through the spring carrier arrangement 29, the spring carrier arrangement being disposed between the main frame 27 and bearing cap 28. The spring carrier arrangement has components which are stacked, with the stack being sandwiched between the main frame and bearing cap before a plurality of bearing cap fasteners 47 are inserted in channels in the bearing cap and main frame and tightened. Particularly, the spring carrier arrangement includes a plurality of sealed bearings, including an upper bearing 37 and lower bearing 41. The sealed bearings are configured to fit loosely within bearing cavities 51 and 52 of the main frame and bearing cap respectively (bearing cavity of the main frame also visible in FIG. 5), permitting the spring carrier arrangement to at least partially rotate relative to the main frame and bearing cap. The interior diameter of the sealed bearings is sized to fit over collars disposed on the top and bottom face of the spring carrier. The sealed bearings at least partially facilitate rotation of the mirror stem arrangement within the main frame and bearing cap, while reducing vibration which might otherwise be transmitted to the mirror and permitting a smooth rotation.

The spring carrier arrangement 29 also includes a compression spring 39 and a spring bushing 40 (the spring bushing 40 having a face 43 disposed on the end of the bushing opposite the compression spring) which will be described in further detail elsewhere.

Once the spring carrier arrangement 29 is sandwiched between the main frame 27 and bearing cap 28, with the mirror stem 33 inserted through the channel in the main frame and through the apertures in the spring carrier arrangement, a lower bushing 42 is slipped over the mirror stem and inserted into a lower bushing cavity 48 of the bearing cap. The lower bushing cavity is shaped similarly to the collar cavity 46 of the main frame and the lower bushing is shaped similarly to the upper collar. Therefore, the lower bushing may fit loosely within the lower bushing cavity, permitting the bushing to rotate within the cavity. The two diameters of the lower bushing cavity and lower bushing provide a limit of travel of the bushing within the cavity. Further, at least a portion of the lower bushing protrudes from the bottom of the bearing cap.

Finally, the handle 25 is slipped over the mirror stem 33. An acorn nut 26 (i.e. a mirror stem lock nut) is threaded over the threaded portion 44 of the mirror stem 33 and tightened. A star washer may be disposed between the lower bushing 42 and handle, and another star washer may be disposed between the handle and acorn nut, the star washers providing a better locking of the acorn nut, handle and lower bushing.

The foregoing mirror stem arrangement fixedly couples the handle with the mirror stem and spring carrier. The spacing of the diameters of the channels in the main frame and bearing cap versus the upper collar, bearings and lower bushing permit a loose engagement of these components, as does the protrusion of the lower bushing below the lower face of the bearing cap. Thus, swiveling of the mirror stem is facilitated by not locking the mirror stem with the main frame and bearing cap, but rather, having the components fixed with the mirror stem (e.g. the lower bushing) sit loosely in a lateral direction within the cavities receiving those components in the main frame and bearing cap. The upper and lower bearings disposed within the mirror stem arrangement provide a smooth rotation while reducing vibration of the mirror within the arrangement induced by riding. Therefore the handle, when engaged, rotates the mirror stem and the spring carrier.

Figure 6:
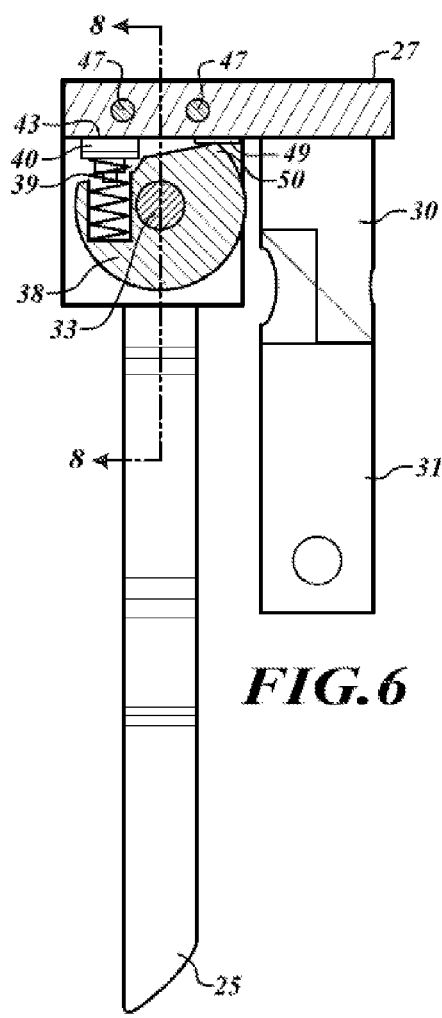
FIGS. 6 and 7 are top cross-sectional views of a section of a broad view mirror for a cycle vehicle, in accordance with an embodiment of the invention.
Figure 7:
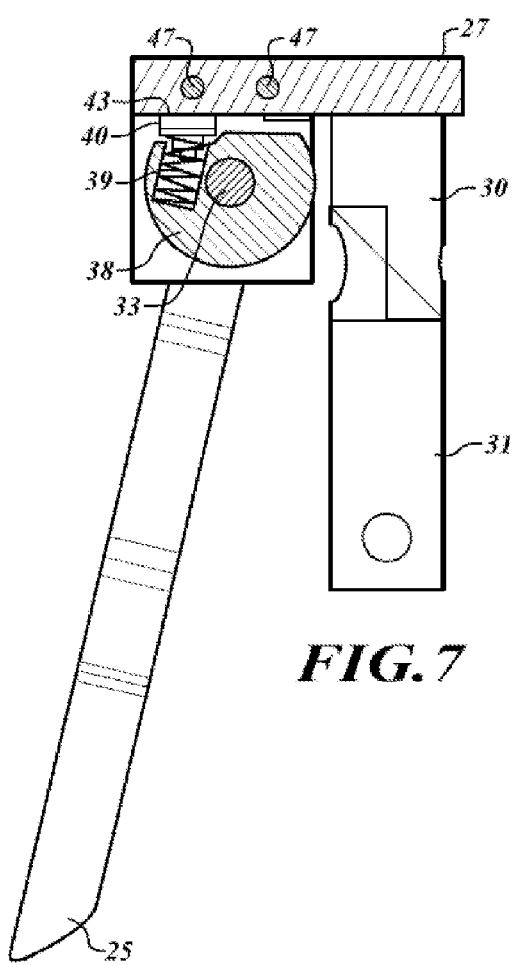

FIGS. 6 and 7 are top cross-sectional views of a section of a broad view mirror for a cycle vehicle, in accordance with an embodiment of the invention. In some embodiments, the broad view mirror 20 includes a spring carrier 38. The mirror stem 33 is disposed through the spring carrier as described elsewhere herein, such that rotation of the mirror stem via the handle 25 being engaged or disengaged also rotates the spring carrier. The spring carrier carries at least a portion of a compression spring 39 (a channel cut into the spring carrier is configured for receiving the at least a portion of the compression spring). A spring bushing 40 is provided, the spring bushing including a shaft which is inserted into the compression spring. The spring bushing also has a face 43 disposed on the end of the spring bushing opposite the compression spring. In some embodiments, a washer may be slipped over the shaft of the spring bushing, the washer disposed between the compression spring and the face of the spring bushing.

When the spring carrier 38 is sandwiched between the main frame 27 and bearing cap 28 (as may be seen and was described with reference to FIGS. 4 and 8), the compression spring 39 and spring bushing 40 are disposed such that the face 43 of the spring bushing engages a portion of the main frame. The opposite end of the spring tensionally biases the spring carrier itself, rotating it within the main frame and bearing cap. This rotation is limited by an angular portion 50 of the spring carrier contacting the main frame. In some embodiments, a pad 49 may be inserted in the device between the angular portion of the spring carrier and the main frame. The spring carrier and main frame are constructed of metal, so the pad reduces the impact of the angular portion against the main frame.

When the handle 25 is engaged, the compression spring 39 is compressed as the spring carrier 38 rotates, as is shown in FIG. 7. Upon the handle being released, the compression spring expands since it is no longer under the pressure of the handle being engaged. The expansion of the compression spring rotates the spring carrier to its original position. As the spring carrier is fixed relative to the mirror stem 33 as described elsewhere herein, engagement of the handle rotates the mirror stem as well as the spring carrier, while releasing the handle rotatably returns the spring carrier and mirror stem to their original position, with the angular portion 50 of the spring carrier resting against the pad 49 and a portion of the main frame 27.

FIG. 5 is an exploded isometric view of a mounting arrangement of a broad view mirror for a cycle vehicle, in accordance with an embodiment of the invention. FIGS. 9 and 10 are rear plan views of a broad view mirror for a cycle vehicle, in accordance with an embodiment of the invention. FIG. 11 is a side plan view of a broad view mirror for a cycle vehicle, in accordance with an embodiment of the invention. In some embodiments, a broad view mirror includes at least a frame mounting bracket 30 (Mounting Bracket Part A) and a handlebar mounting bracket 31 (Mounting Bracket Part B).

The frame mounting bracket 30 is rotatably coupled with the main frame 27 using a threaded fastener. As may be seen in FIGS. 9 and 10, the frame mounting bracket may be rotated to the desired orientation prior to tightening the threaded fastener. (The handlebar mounting bracket is shown in FIGS. 9 and 10 as inline coaxially with the frame mounting bracket.) A star washer may be provided for maintaining a better locking of the frame mounting bracket to the main frame. Additionally, as may be seen in FIG. 11, the handlebar mounting bracket 31 rotatably couples with the frame mounting bracket 30 using an additional threaded fastener. The handlebar mounting bracket may be at least partially rotated relative to the frame mounting bracket to a desired orientation prior to tightening the additional threaded fastener. An additional star washer may be provided for maintaining a better locking of the frame mounting bracket and handlebar mounting bracket. (FIG. 5 shows the fastener and star washer arrangement with the mounting brackets.)

The rotations of the frame mounting bracket 30 and handlebar mounting bracket 31 may be performed after the handlebar mounting bracket is mounted to the handlebar 21 (via the lever assembly 24 as described elsewhere herein). By loosening the threaded fasteners coupling the mounting brackets and main frame 27 and rotating the mounting brackets, the position of the main frame may be adjusted to a substantially level position relative to the ground, providing a substantially plumb orientation of the mirror stem 33. The mounting brackets are orthogonal to one another, ensuring that any positioning of the brackets and main frame required to achieve the leveling of the main frame is possible. Leveling the main frame and achieving a plumb orientation of the mirror stem ensures that when the handle 25 is operated, the mirror 34 retains a substantially level position, rotating only in the mirror stem axis and not drooping or turning diagonally.

Figure 12:
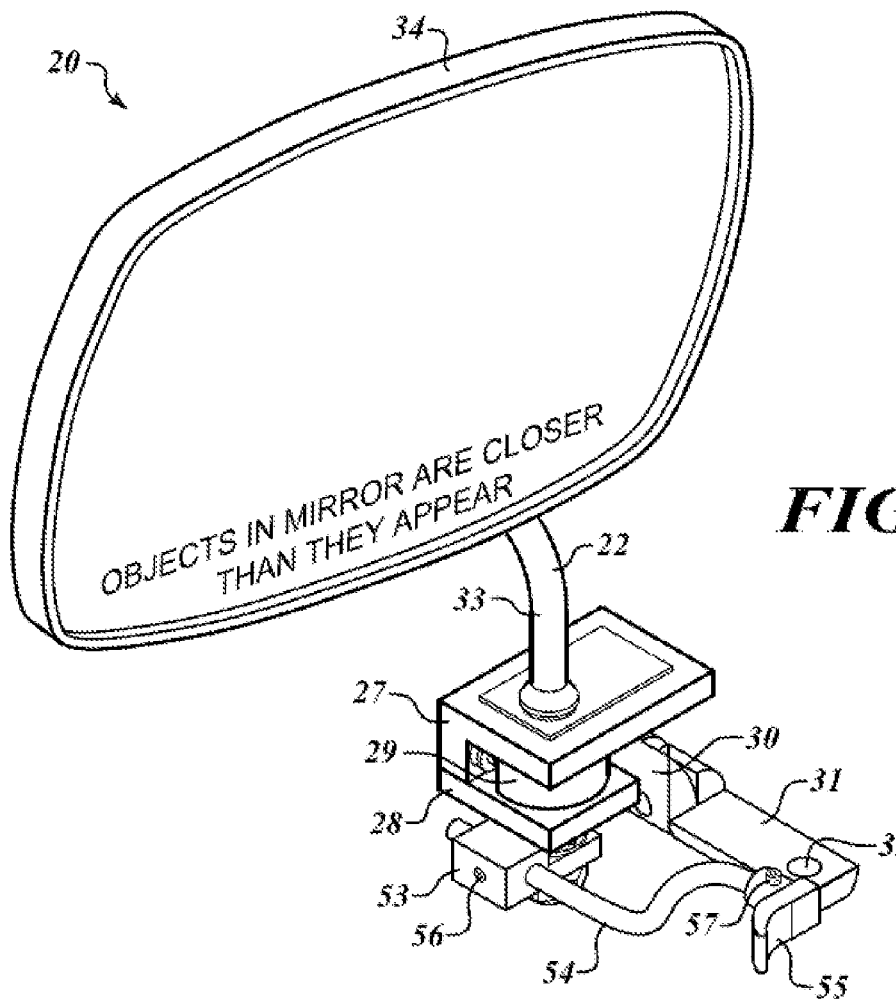
FIG. 12 is an isometric view of a broad view mirror for a cycle vehicle installed on a handlebar, in accordance with an embodiment of the invention.
Figure 13:
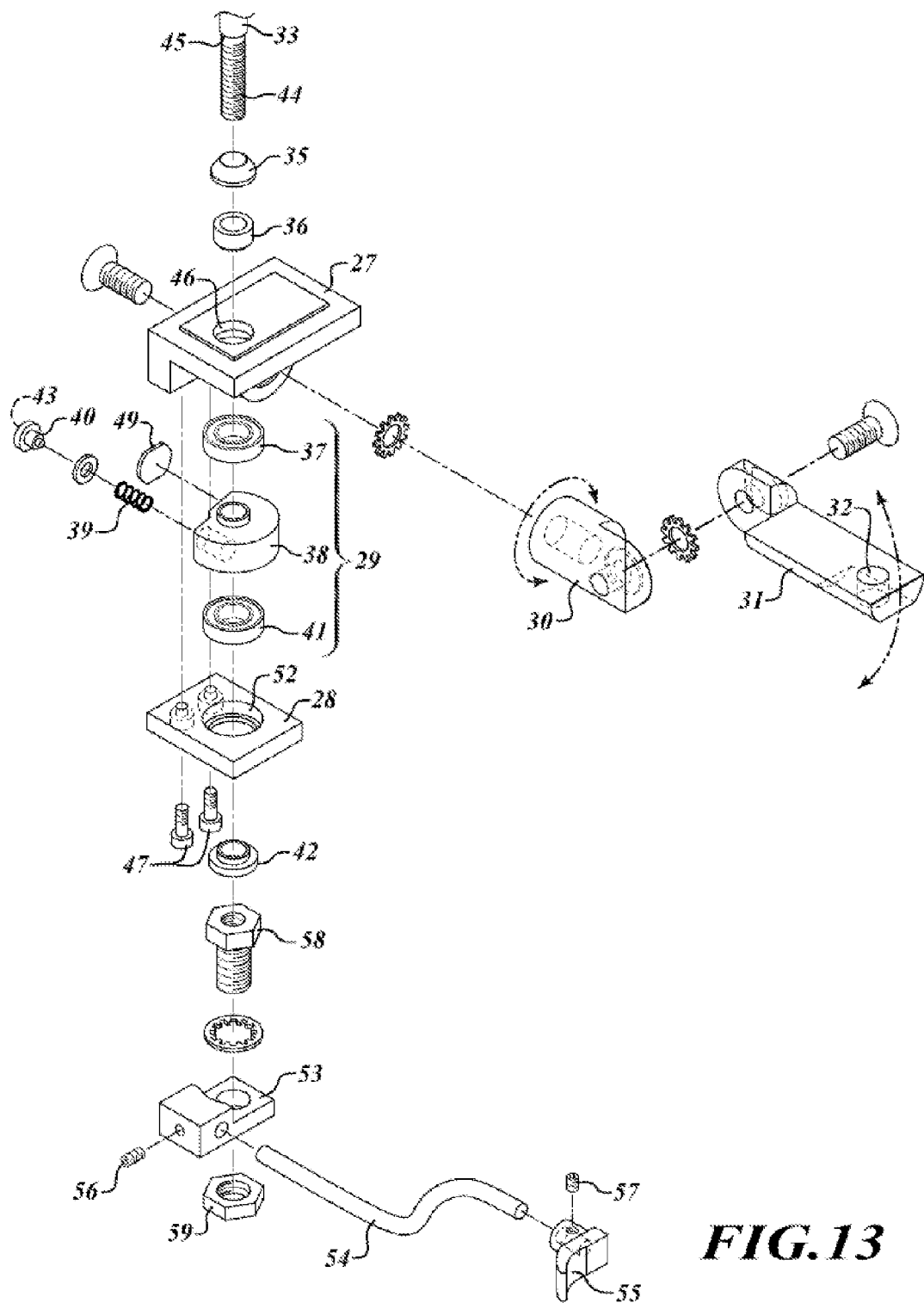
FIG. 13 is an exploded isometric view of a broad view mirror for a cycle vehicle, in accordance with an embodiment of the invention.

FIG. 12 is an isometric view of a broad view mirror for a cycle vehicle installed on a handlebar, in accordance with an embodiment of the invention. FIG. 13 is an exploded isometric view of a broad view mirror for a cycle vehicle, in accordance with an embodiment of the invention. In some embodiments, a handle 54 may be a rounded tube. The rounded tube handle may be inserted into a lever link 53, the lever link having a rounded channel configured for mating with the rounded tube handle, wherein the rounded tube handle is inserted into the rounded channel and fixed into place with a lever link set screw 56. The lever link may have a threaded channel for receiving the lever link set screw, wherein the channel is disposed from an exterior portion of the lever link to the rounded channel. The lever link set screw may be threaded into the threaded channel of the lever link and tightened to rest against the side of the rounded tube handle, fixing the rounded tube handle into place rotationally within the lever link.

It may be seen that the rounded tube handle can be rotated upon being inserted into the lever link and prior to the lever link set screw being tightened. The rounded tube handle may have one or more bends at an end opposite the end inserted into the lever link. The one or more bends define a section of the rounded tube handle which may be engaged by the rider to actuate the rotation of the mirror and mirror stem (the "actuation end"). It may also be seen that the rounded tube handle may be inserted into the rounded channel of the lever link and pushed farther into (i.e. more of the rounded tube comes out the other side of the lever link), or pulled away from, the lever link.

Rotating the rounded tube handle and/or sliding the tube further into or away from the lever link upon it being inserted into the lever link (i.e. "articulating" the tube relative to the lever link) enables the rounded tube handle to be rotated and adjusted into a position where can be most comfortably actuated by the rider and/or where the rounded tube handle is clear of other cycle vehicle components (e.g. handlebar, levers, cables, decorative elements, mounting arrangements for the broad view mirror, mounting arrangements for other components of the cycle vehicle, etc.).

In some embodiments, the actuation end may be hammered flat to provide an engagement point for the rider to actuate the mirror rotation. In some embodiments, the rounded tube handle may be polished aluminum, chrome plated, powder coated, etc. In some embodiments, the rounded tube handle is bendable by the rider. In other embodiments, the rounded tube handle is not bendable by the rider.

In some embodiments, a thumb knob 55 is coupled with the rounded tube handle 54. The thumb knob may have a rounded cavity configured for receiving the rounded tube handle. A thumb knob set screw 57 may be threaded into a threaded channel of the thumb knob. The thumb knob set screw may be threaded to rest against the side of the rounded tube handle, fixing the thumb knob into place rotationally about the rounded tube handle. It may be seen that, prior to tightening the thumb knob set screw, the thumb knob may be rotated into a position where it may be conveniently reached by the thumb or other digit of the rider. The rider may adjust the rounded tube handle and thumb knob in tandem and tighten their respective set screws upon finding an ideal configuration (i.e. a setup which is clear of other motorcycle components and easily reached by the rider without lifting a hand off the handlebar) for the rounded tube handle and thumb knob. The foregoing configurability expands the range of cycle vehicles with which the broad view mirror may be used, providing additional adjustability to fit varying handlebar shapes and angles.

Of course, other shapes of thumb knobs are possible without impacting the functionality of the device. Decorative thumb knobs including the rounded cavity and thumb knob set screw channel may be used. Such thumb knobs may be decorated with images of skulls, inset with graphics, in the form of a logo of a motorcycle manufacturer, etc. Thumb knobs may be shaped like a trigger as shown or may have different forms. In some embodiments, the thumb knob may be polished aluminum, chrome plated, powder coated, etc.

A lever link is coupled with the rest of the broad view mirror via the mirror stem 44 being inserted into a circular aperture in the lever link 53 and a hex nut 59 being threaded onto the mirror stem. In an environment such as that depicted in FIG. 13, where the mirror stem is not long enough to protrude through both the bearing cap 28 and the bottom of the lever link, an extension nutbolt 58 may be employed, with the threaded end of the mirror stem being inserted into the threaded cavity at the top of the nutbolt, and with the threaded exterior portion of the nutbolt being passed through the lever link. Tightening the hex nut affixes the lever link with the mirror stem or nutbolt. Washers may be used to further secure the coupling.

Figure 14:
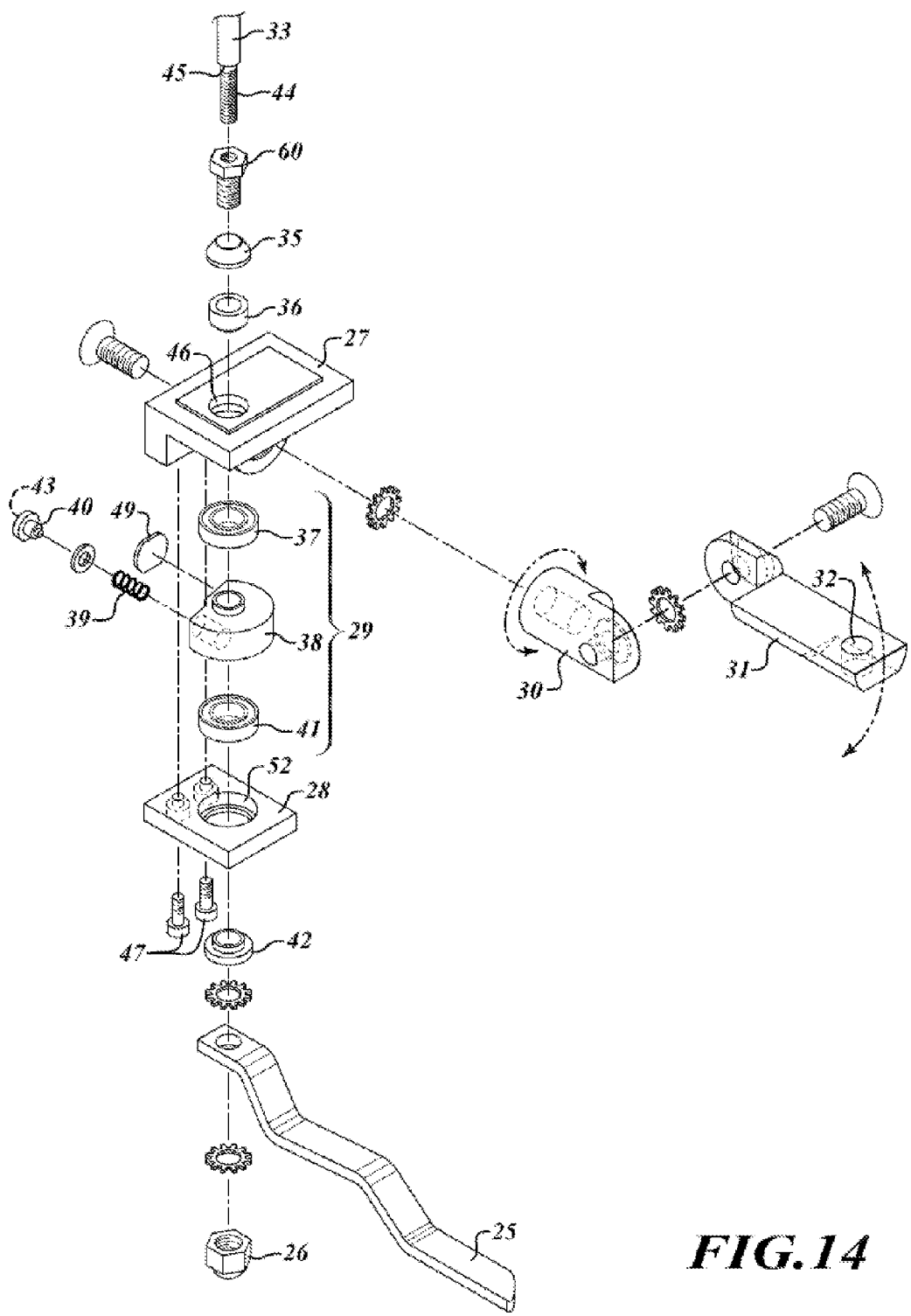
FIG. 14 is an exploded isometric view of a broad view mirror for a cycle vehicle, in accordance with an embodiment of the invention.

FIG. 14 is an exploded isometric view of a broad view mirror for a cycle vehicle, in accordance with an embodiment of the invention. As described previously, prior to installation of a broad view mirror, a mirror stem of a factory mirror arrangement is passed through a clutch lever assembly (the mirror stem may go alternatively through the brake lever assembly on the other side of the cycle vehicle). During installation, the mirror may be removed, the mounting for the broad view mirror is installed, and the mirror stem is passed through components of the broad view mirror (e.g. the main frame, spring carrier arrangement, bearing cap, etc) before being fixedly tightened with an acorn nut or other fastener. In environments where the mirror stem is not long enough to pass through the components of the broad view mirror, an adapter 60 may be utilized.

The adapter, which may be shaped like the nutbolt disclosed with reference to FIGS. 12 and 13, threads onto the mirror stem (i.e. a threaded cavity at the top of the adapter receives the mirror stem, which is screwably threaded into the top of the adapter). The adapter has an exterior threaded portion opposite the cavity. The exterior threaded portion may then be passed through the components of the broad view mirror prior to an acorn nut or other fastener (such as a hex nut) being threaded onto the end of the adapter. It may be seen that adapters having different lengths can be used to effectively extend the length of the mirror stem. Additionally, the adapter may be used to convert a mirror stem having one type of threading (standard, metric, fine, coarse, etc.) for use with an acorn nut or other coupling having a different type of threading. Further, the adapter may be used in applications where the diameter of the factory mirror is too large for the mirror stem to pass through the main frame, spring carrier arrangement, and bearing cap etc., whereby an adapter having a threaded cavity with a large enough diameter can receive the mirror stem and, the adapter further having a smaller diameter exterior threaded portion for insertion into the broad view mirror components. Further, the adapter may be used in conjunction with broad view mirror arrangements having the flat handle disclosed with reference to FIGS. 1-11 as well as with the rounded tube handle disclosed with reference to FIGS. 12 and 13.

Figure 15:
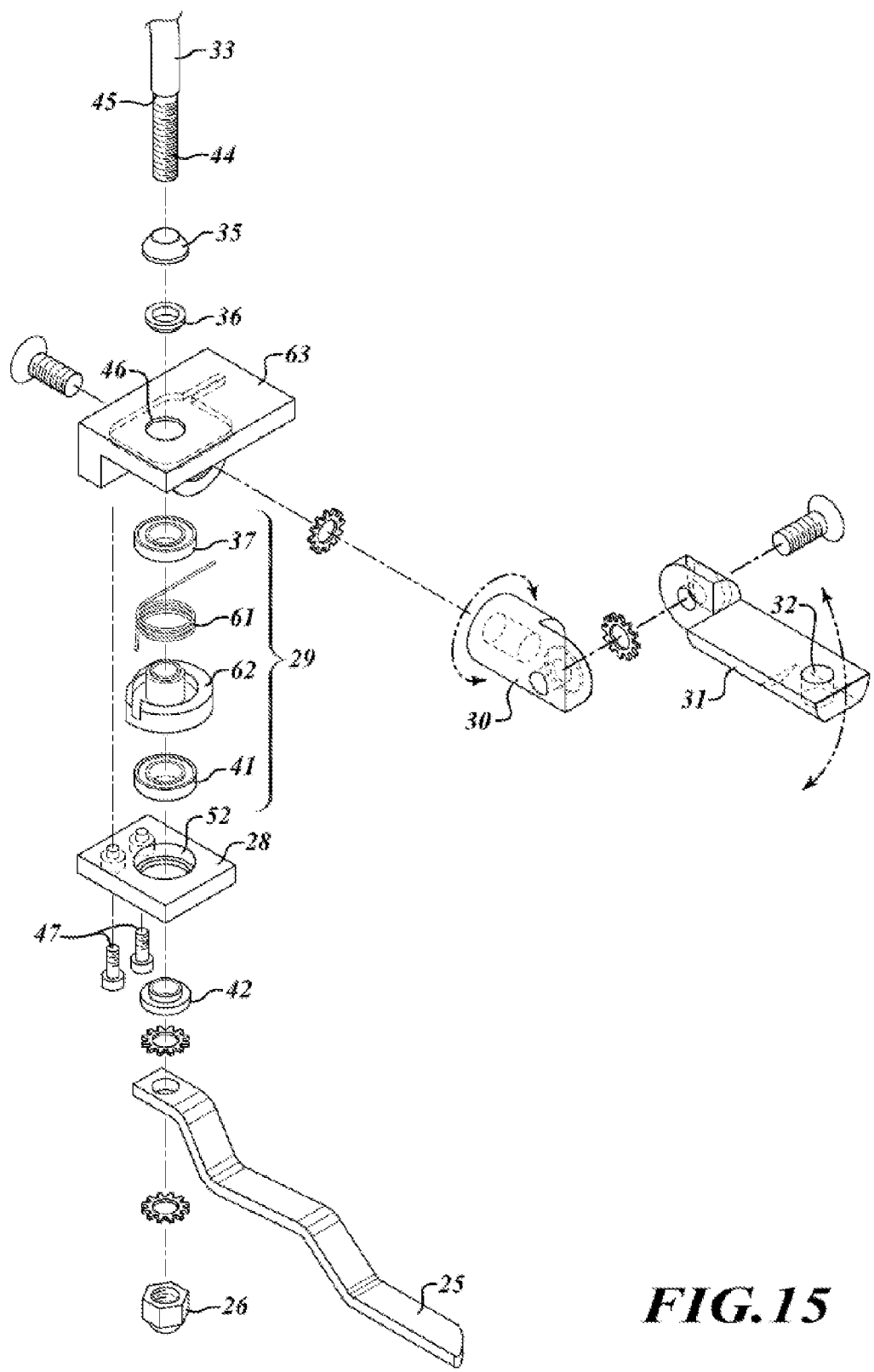
FIG. 15 is an exploded isometric view of a broad view mirror for a cycle vehicle, in accordance with an embodiment of the invention.
Figure 18:
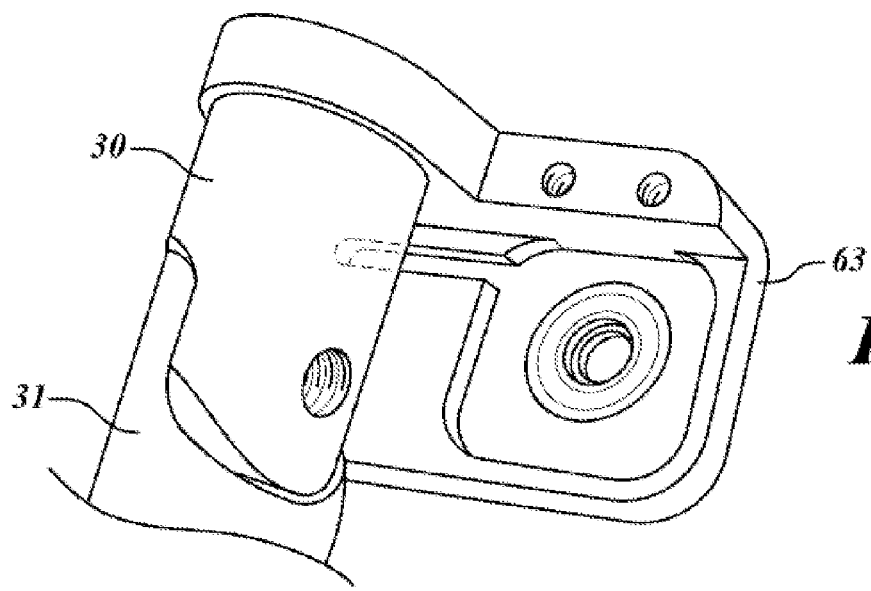
FIGS. 18 and 19 are isometric views of a main frame of a broad view mirror for a cycle vehicle, in accordance with an embodiment of the invention.
Figure 19:
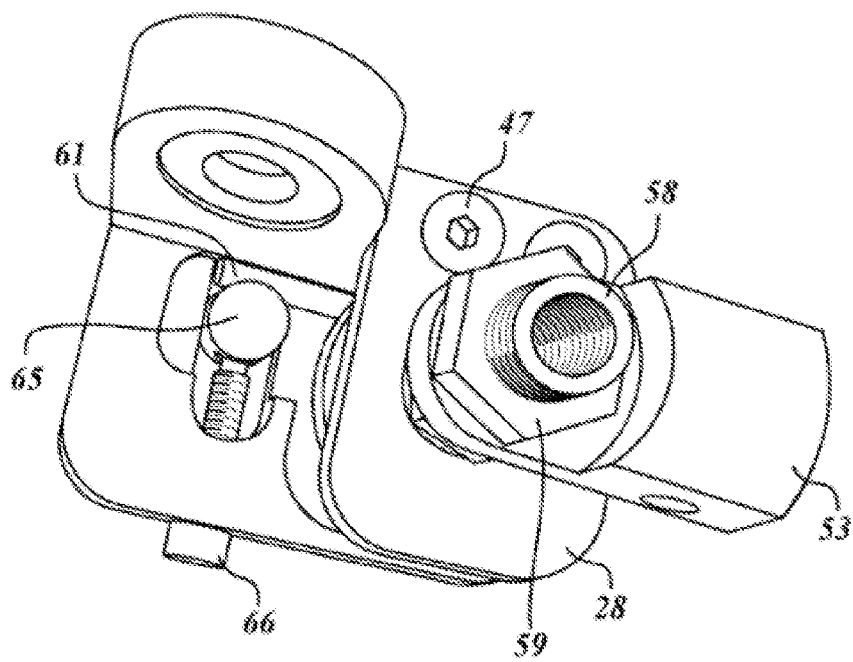

FIG. 15 is an exploded isometric view of a broad view mirror for a cycle vehicle, in accordance with an embodiment of the invention. FIGS. 16 and 17 are top cross-sectional views of a section of a broad view mirror for a cycle vehicle, in accordance with an embodiment of the invention. FIGS. 18 and 19 are isometric views of a main frame of a broad view mirror for a cycle vehicle, in accordance with an embodiment of the invention. In some embodiments, a torsion spring 61 may be used to rotatably tensionally bias the mirror stem (or extension to the mirror stem where used with an adapter) to return the BVM to the first position. The torsion spring is used with a torsion spring main frame 63, which is similar to the main frame 27 disclosed with respect to FIGS. 1-11, but with a groove for receiving a long straight portion of the torsion spring. A cylindrical portion of a torsion spring carrier 62 is inserted into the coiled section of the torsion spring. The torsion spring carrier has a notch for receiving the short straight portion of the torsion spring (i.e. the end of the torsion spring opposite its long straight portion). It will be seen from FIGS. 15-17 that a portion of the torsion spring carrier is flat, defining a limit of rotation of the received mirror stem by the flat portion of the torsion spring carrier engaging a portion of the main frame.

A torsion spring carrier arrangement is disposed between torsion main frame 63 and bearing cap 28. The torsion spring carrier arrangement has components which are stacked, with the stack being sandwiched between the torsion main frame and bearing cap before a plurality of bearing cap fasteners 47 are inserted in channels in the bearing cap and torsion main frame and tightened. Particularly, the torsion spring carrier arrangement includes a plurality of sealed bearings, including an upper bearing 37 and lower bearing 41. The sealed bearings are configured to fit loosely within bearing cavities 51 and 52 of the torsion main frame and bearing cap respectively (bearing cavity 51 of the underside of the torsion main frame also visible in FIG. 18, with upper bearing 37 disposed in the cavity), permitting the torsion spring carrier arrangement to at least partially rotate relative to the torsion main frame and bearing cap. The interior diameter of the sealed bearings is sized to fit over collars disposed on the top and bottom face of the torsion spring carrier. The sealed bearings at least partially facilitate rotation of the mirror stem arrangement within the torsion main frame and bearing cap, while reducing vibration which might otherwise be transmitted to the mirror and permitting a smooth rotation.

As described in part above, the torsion spring carrier 62 (the torsion spring carrier having torsion spring 61 seated into it with the short straight portion of the torsion spring fitting into the notch) is sandwiched during assembly between the torsion main frame 63, the upper bearing, the lower bearing, and the bearing cap 28. The long straight portion of the torsion spring is fitted into the groove of the torsion main frame. As may be seen in the top cross-sectional views FIGS. 16 and 17, the mirror stem 33 is passed through the torsion spring carrier 62 and torsion spring 61 during assembly. The ends of the torsion spring are fixed in place, with the long straight end of the torsion spring disposed in the groove in the underside of the torsion main frame and the short straight end of the torsion spring disposed in the notch of the torsion spring carrier. This torsion spring carrier arrangement facilitates rotation of the mirror stem about its longitudinal axis. The torsion spring has a tendency to keep the mirror stem in the first position shown in FIG. 16. Engaging the handle 25 would rotate the spring carrier arrangement and mirror stem as shown in FIG. 17. Upon releasing the handle, the torsion spring would return the mirror stem to its first position.

In an alternate embodiment of a torsion spring main frame, as shown in FIG. 19 (mounting brackets 30 and 31 removed from FIG. 19 for clarity), an elongated torsion spring set screw 66 may be used during assembly of the broad view mirror. Particularly, a channel may be disposed through the torsion spring main frame which is sized to receive a spacer 65 which rests against the torsion spring 61 in the groove in the underside of the torsion spring main frame 63. This enables the torsion spring carrier having the torsion spring seated in it to be sandwiched between the bearings, main frame, and bearing cap without having to get the long straight end of the torsion spring in place. Then, the torsion spring set screw may be threaded into the threaded channel through the torsion spring main frame, pressing the spacer against the torsion spring and locking it into place in its groove.

FIG. 19 also depicts the underside of the broad view mirror when used with the rounded tube handle system utilizing the lever link 53, secured to the system using nutbolt 58 and hex nut 59 after bearing cap 28 is secured to the torsion main frame with bearing cap fasteners 47. It will be apparent that the either the flat handle disclosed with respect to FIGS. 1-11, inter alia, or the rounded tube handle disclosed with respect to FIGS. 12 and 13 may be utilized and/or interchanged with either the compression spring carrier arrangement or the torsion spring carrier arrangement in accordance with the needs of a particular cycle vehicle or application.

A torsion spring carrier arrangement may enable smaller versions of a broad view mirror which are more appropriately sized for scooters or bicycles, for example. In other embodiments, the rotational bias of the mirror stem may be accomplished with pull or extension springs or flat springs. In yet other embodiments, a rubber torsion bushing may be used instead of a spring. A mirror stem (or extension) would be threaded through the rubber torsion bushing. The rubber would facilitate rotation about the stem upon a handle being actuated, and the rubber would have a tendency to return the mirror stem to its original position upon the handle being released.

Figure 20:
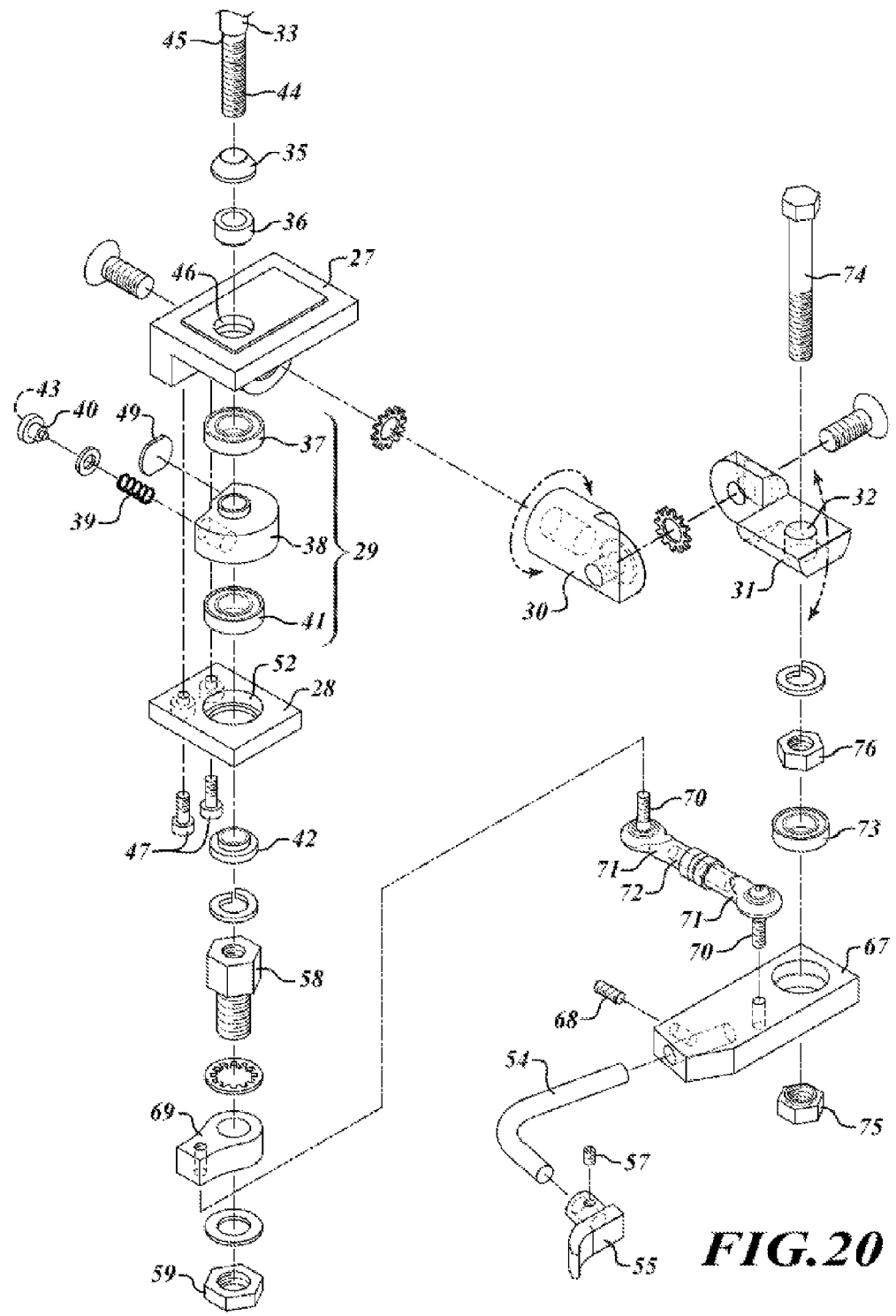
FIG. 20 is an exploded isometric view of a broad view mirror for a cycle vehicle, in accordance with an embodiment of the invention.
Figure 21:
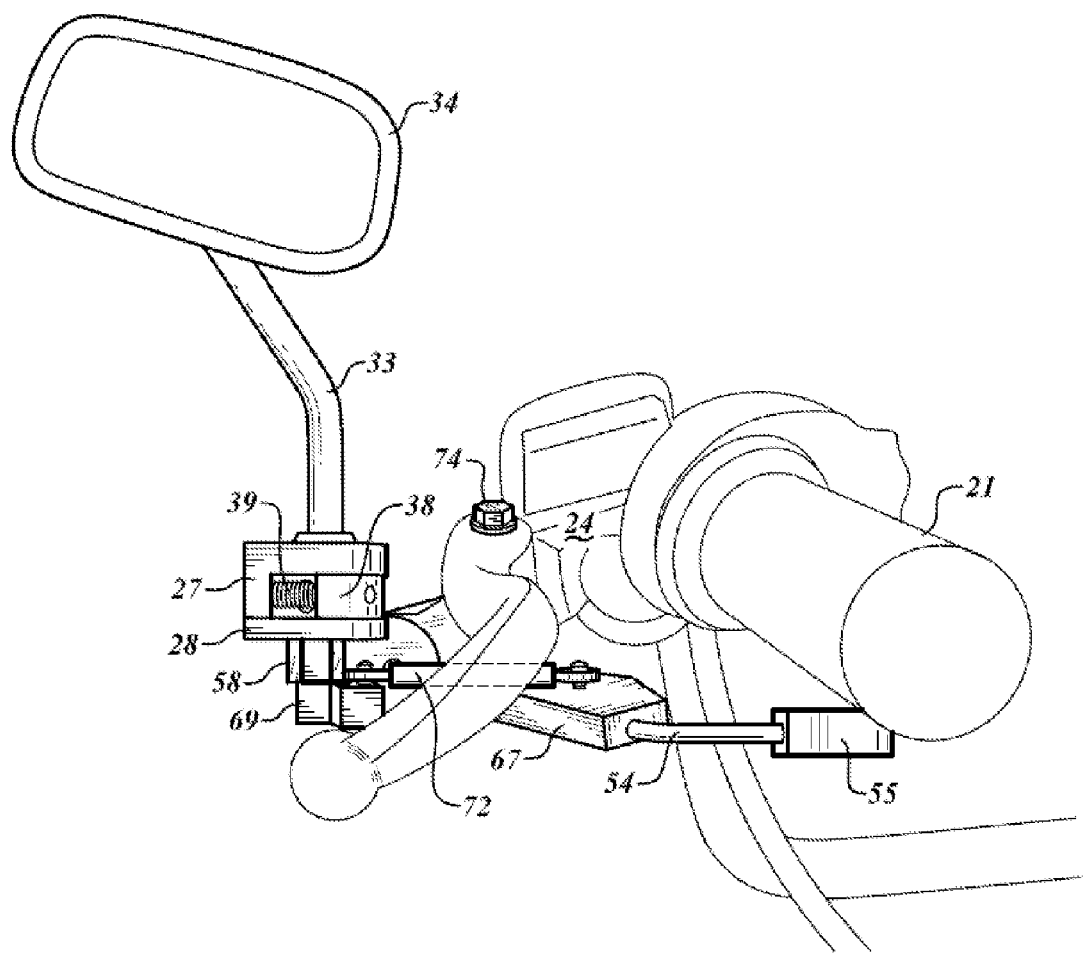
FIG. 21 is an isometric view of a broad view mirror for a cycle vehicle installed on a handlebar, in accordance with an embodiment of the invention.

FIG. 20 is an exploded isometric view of a broad view mirror for a cycle vehicle, in accordance with an embodiment of the invention. FIG. 21 is an isometric view of a broad view mirror for a cycle vehicle installed on a handlebar, in accordance with an embodiment of the invention. In some embodiments, it is desirable for the handle which actuates rotation of the mirror to be located remotely from the mirror. For example, as seen in FIG. 21, it may be desirable to mount the handle underneath the clutch (or brake) lever assembly rather than underneath the mirror. A tie rod 72 may be used to couple the handle and mirror situated remotely from one another.

In such an embodiment, the handle is mounted directly underneath the clutch (or brake) assembly 24 of the handlebar 21. Mounting bolt 74 passes through the clutch (or brake) assembly 24, then through the handlebar mount channel 32 of the handlebar mounting bracket 31. A spacer nut 76 and tie rod bearing 73 are used, the tie rod bearing sitting in a cavity of a tie rod lever link 67. The tie rod bearing enables the handle and tie rod lever link with which the handle is coupled to smoothly rotate about an axis defined by the longitudinal axis of the mounting bolt. Once the mounting bolt is passed through the tie rod lever link, a tie rod nut 75 is threaded onto the mounting bolt, tightening the tie rod lever link in place. As was described in relation to FIGS. 12 and 13, a rounded tube handle 54 may be inserted into a channel in the tie rod lever link and affixed with a tie rod lever link set screw 68. Also as described in relation to FIGS. 12 and 13, a thumb knob 55 can optionally be coupled with the rounded tube handle 54 using the thumb knob set screw 57. It will be seen that a flat handle, such as the handle described with respect to FIGS. 1 through 11, may alternatively be used, by threading the mounting bolt through it and tightening nut 75 (or an acorn nut).

Below the mirror stem, rather than a handle, a tie rod link 69 is threaded onto the mirror stem (or onto nutbolt 58, as shown in FIG. 20) and secured with a hex nut 59. The tie rod link has a threaded channel disposed through it for receiving a threaded tie rod fastener 70. Additionally, the tie rod lever link has a threaded channel disposed through it for receiving another threaded tie rod fastener. The tie rod 72 has two tie rod links 71. Internal to the tie rod may be a threaded portion (shown in dashed lines in FIG. 20) having threads at least at each end. The threaded end portions receive a tie rod link, which are screwed into place. The length of the tie rod may be adjusted by either using different length internal threaded portions, or by using spacers or washers disposed about the internal threaded portion prior to threading a tie rod link onto the internal threaded portion. (In some embodiments, the tie rod may have an internal portion threaded only on one end and with a tie rod link permanently coupled to the other end, such that adjusting the length occurs only by adjusting the removable tie rod link at one end.) The tie rod links have a channel through them for insertion of the threaded tie rod fastener. The threaded tie rod fastener is inserted through the channel and then into the corresponding channel on either the tie rod link or the tie rod lever link. Upon completing the assembly, actuating the handle (or thumb knob) will engage the tie rod, which will in turn engage the tie rod link to rotate the mirror stem assembly.

It will be understood that the threaded tie rod fasteners may be used to fasten the tie rod to either the top side or the bottom side of the tie rod lever link, depending on the configuration of the cycle vehicle. It will also be understood that the threaded tie rod fasteners may be used to fasten the tie rod to either the top side or the bottom side of the tie rod link, depending on the configuration of the cycle vehicle. Further, it will be apparent that the tie rod arrangement may be used with broad view mirror configurations utilizing either the compression spring carrier arrangement or the torsion spring carrier arrangement without altering the functionality or usefulness of the tie rod.

Figure 22:
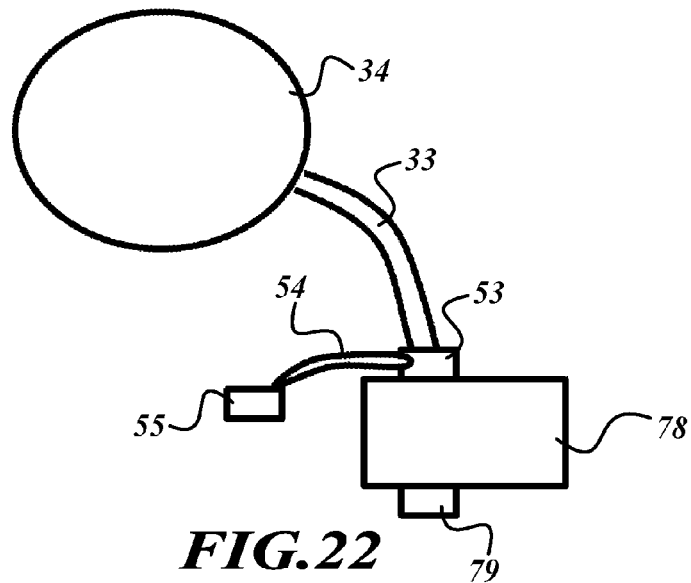
FIG. 22 is a front view of a broad view mirror for a cycle vehicle, in accordance with an embodiment of the invention.

FIG. 22 is a front view of a broad view mirror for a cycle vehicle, in accordance with an embodiment of the invention. In some embodiments, depending on the particular cycle vehicle, application, or desired appearance, it may be advantageous for the handle which rotates the mirror to be located above the main frame, spring carrier arrangement (either torsion or compression spring), and bearing cap (the main frame, spring carrier arrangement, and bearing cap being consolidated for clarity in FIG. 22 as body 78. FIG. 22 depicts the mirror stem passing through lever link 53 before entering body 78 (i.e. the main frame, spring carrier arrangement, and bearing cap) prior to being secured to the broad view mirror with a nut or other fastener 79. Rounded tube handle 54 is coupled with the lever link using means disclosed elsewhere herein. As with embodiments discussed relative to FIGS. 12 and 13 inter alia, a thumb knob 55 may also be attached to the rounded tube handle. The flat handle disclosed in relation to FIGS. 1-11 may also be used in this arrangement whereby the handle is above the body of the broad view mirror.

Figure 23:
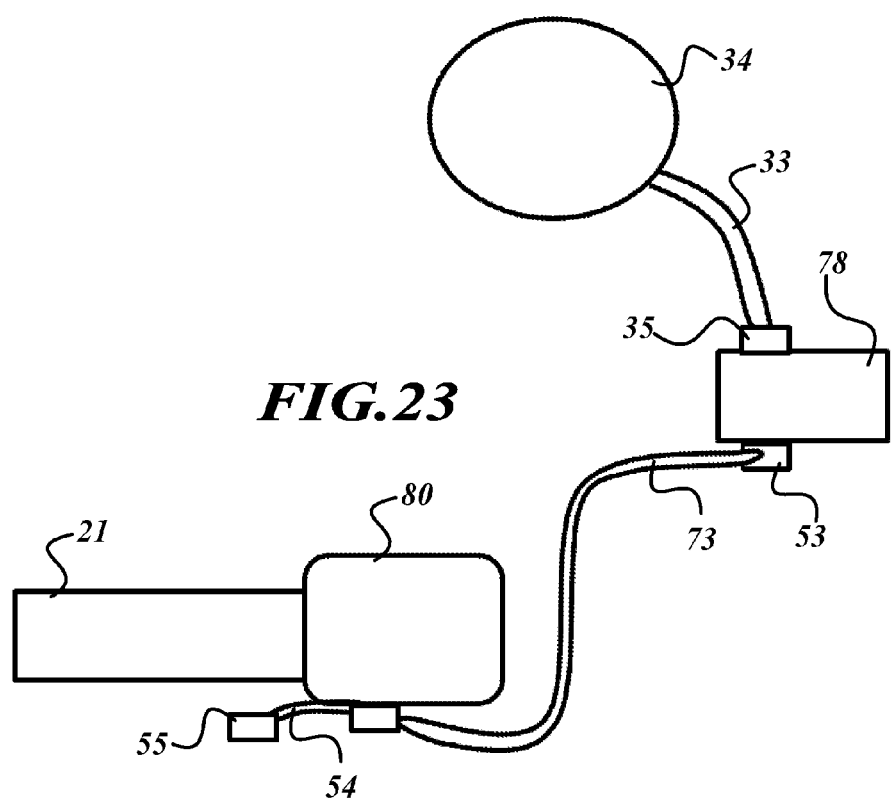
FIG. 23 is a front view of a broad view mirror for a cycle vehicle, in accordance with an embodiment of the invention.

FIG. 23 is a front view of a broad view mirror for a cycle vehicle, in accordance with an embodiment of the invention. In some embodiments, depending on the particular cycle vehicle, application, or desired appearance, it may be advantageous for the handle which rotates the mirror to be located remotely from the mirror stem. Such applications may involve a desired distance between the handle and the mirror stem exceeding the length of a tie rod, or where a fixed tie rod cannot be used because the desired location of the handle would render the tie rod unable to be installed (where the mirror and handle are on opposite sides of the handlebar, e.g.) or would leave the tie rod in the way of the rider. This issue is solved by mounting the handle elsewhere on the cycle vehicle using a remote handle mount 80. For example, the handle may be disposed at the very end of the handlebar 21, or on a frame for a windscreen, or any other location on the cycle vehicle. A bicycle-derailleur style cable 73 links the handle (which may be rounded tube handle 54 optionally with thumb knob 55, or may be a flat handle disclosed elsewhere herein) with lever link 53, which is installed underneath the mirror stem in a manner similar to that disclosed with respect to the tie rod and FIGS. 20 and 21. In this way, actuating the remotely-located handle pulls the derailleur cable, which in turn pulls the lever link rotating the mirror stem. The derailleur cable may be interior to a housing and be able to be pulled through the housing when the handle is actuated.

Figure 24:
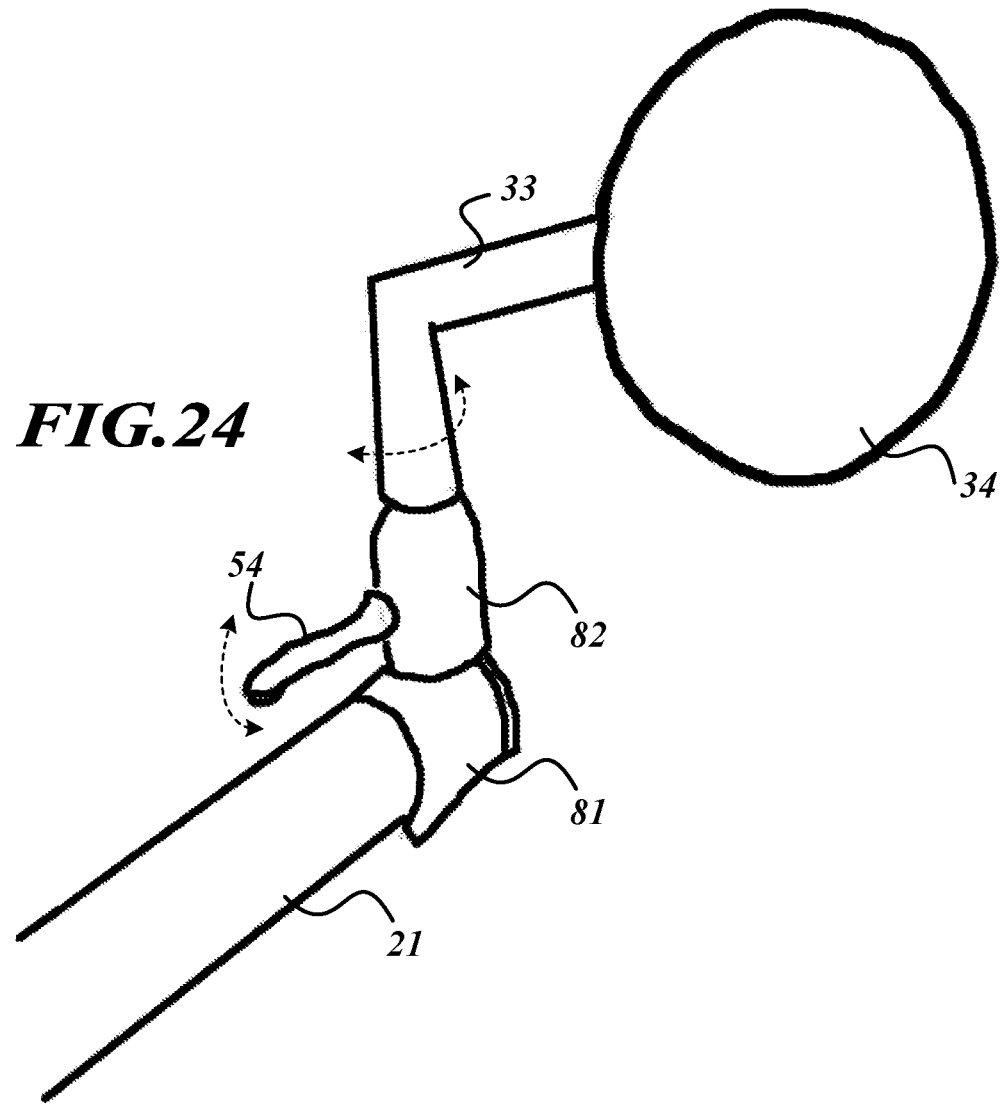
FIG. 24 is an isometric view of a broad view mirror for a cycle vehicle installed on a handlebar, in accordance with an embodiment of the invention.

FIG. 24 is an isometric view of a broad view mirror for a cycle vehicle installed on a handlebar, in accordance with an embodiment of the invention. In some embodiments, the broad view mirror for a cycle vehicle may be slipped over the end of a handlebar. A collar 81 may have a cavity for receiving a handlebar end. The collar may have an adjustable diameter, perhaps by being constructed of rubber so that it can mold to the outside of the handlebar, or perhaps using a clamp which can be tightened with a threaded fastener to secure the collar to the handlebar. Housing 82 is coupled with collar 81. Handle 54 extends from inside housing 82 to the outside, permitting engagement of the handle for rotating the mirror stem 33. Inside housing 82 may be a gear arrangement coupling the handle and mirror stem. Alternatively, the handle may be coupled directly to the mirror stem. A spring arrangement (e.g. the torsion spring arrangement disclosed elsewhere herein) may be in place to tensionally bias the mirror stem to a first position, whereby the handle can be actuated by a rider to push the mirror into a second position from which the mirror will return when the handle is released. In an alternative to the spring arrangement, a rubber torsion bushing may be disposed inside housing 82. The flexible rubber bushing will enable the mirror stem to rotate when the handle is engaged, and upon the handle being released the rubber will have a tendency to return to its original form, rotating the mirror back to its initial position.

Figure 25:
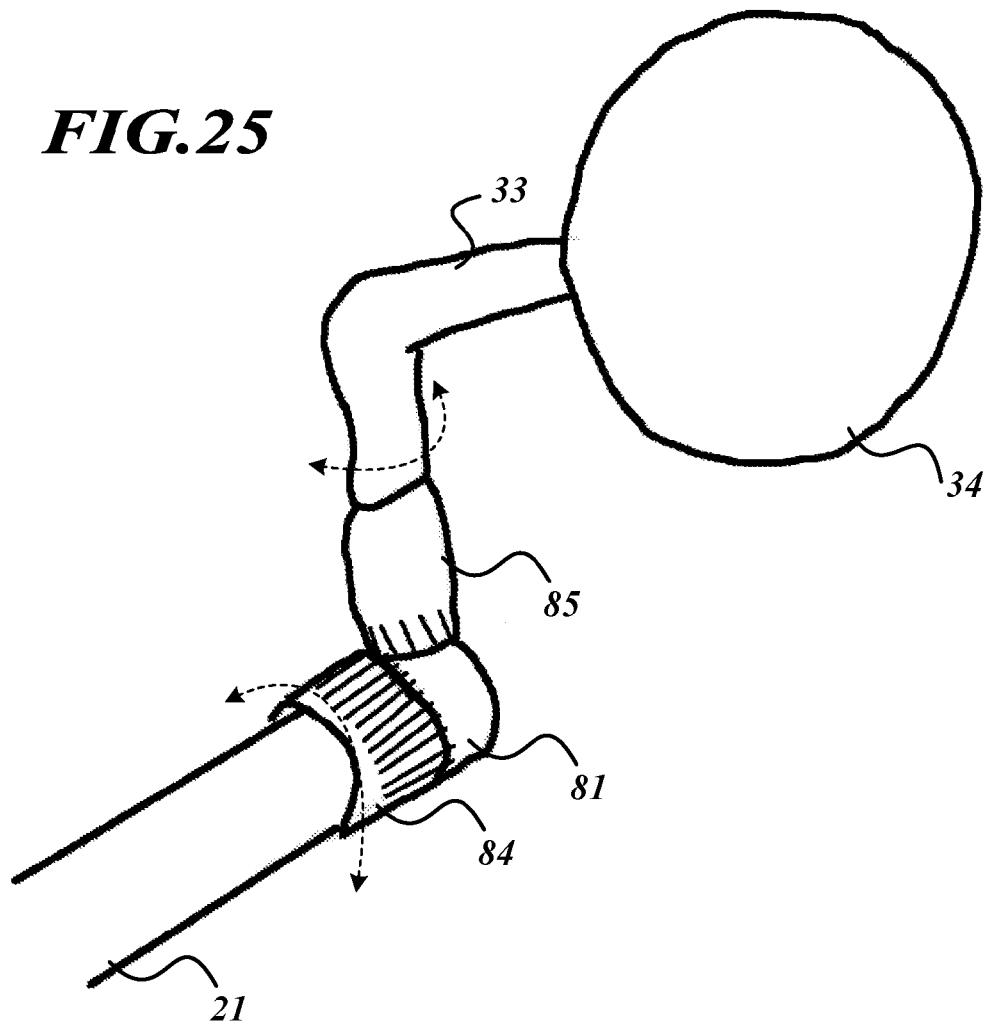
FIG. 25 is an isometric view of a broad view mirror for a cycle vehicle installed on a handlebar, in accordance with an embodiment of the invention.

FIG. 25 is an isometric view of a broad view mirror for a cycle vehicle installed on a handlebar, in accordance with an embodiment of the invention. In some embodiments, a broad view mirror for a cycle vehicle that is slipped over an end of a handlebar may provide a twist handle for rotating the mirror. Adjacent to collar 81, twist handle 84 may be geared, with teeth surrounding the circumference of the twist handle to one side. The gear teeth of twist handle 84 may engage gear teeth of a geared shroud 85, which is on the outside of mirror stem 33. The gear teeth may be internal to the device (i.e. unable to be accessed by the rider) but are shown here on the outside for clarity.

In some embodiments, a method of using a broad view mirror for a cycle vehicle is provided. The method may include an operation of providing a broad view mirror for a cycle vehicle, the broad view mirror including at least a frame mounting bracket and a handlebar mounting bracket. The broad view mirror for a cycle vehicle may be as substantially described elsewhere herein, whereby the BVM may be provided with a mirror and mirror stem arrangement, or without the mirror and mirror stem arrangement. If the BVM is provided without the mirror and mirror stem arrangement, an alternate mirror and mirror stem arrangement is removed from an existing motorcycle having a factory-installed mirror arrangement, the alternate arrangement then being coupled with the BVM.

The method may also include an operation of passing a threaded portion of a mirror stem through a main frame, a spring carrier arrangement, a bearing cap and a handle of the broad view mirror. The spring carrier arrangement is disposed within a gap between the main frame and bearing cap, the gap suitably sized for receiving the spring carrier arrangement while still permitting the spring carrier arrangement to rotate within the main frame and bearing cap.

The method may also include an operation of rotatably threading at least two fasteners through the bearing cap and into the main frame, fixedly coupling the bearing cap and main frame. Fixedly coupling the bearing cap and main frame sandwiches the spring carrier arrangement in between the bearing cap and main frame. The spring carrier arrangement includes bearings disposed around collars in the spring carrier, the bearings being received by bearing cavities in the underside of the main frame and the top surface of the bearing cap.

The method may also include an operation of rotatably threading a fastener onto the threaded portion of the mirror stem, fixedly coupling the mirror stem, handle and spring carrier arrangement. A lower bushing may be threaded onto the mirror stem after pushing the mirror stem through the main frame, spring carrier arrangement and bearing cap, but prior to slipping the handle over the mirror stem and threading the fastener (which may be an acorn nut) onto a threaded portion of the mirror stem and tightening the fastener. Tightening the fastener locks the lower bushing, spring carrier arrangement, handle and mirror stem together, such that engaging the handle rotates the mirror stem.

The method may also include an operation of affixing the handlebar mounting bracket to a handlebar of the cycle vehicle. The handlebar mounting bracket may have a channel disposed through a flat portion of the handlebar mounting bracket, the channel designed so that the handlebar mounting bracket can be slipped over a bolt disposed through a channel in a lever mounting bracket assembly of a handlebar of the motorcycle. The flat portion of the handlebar mounting bracket is configured to rest underneath the lever mounting bracket assembly of the handlebar, with a fastener tightening the mounting bracket and BVM against the assembly.

The method may also include an operation of orienting the frame mounting bracket and handlebar mounting bracket relative to one another and to the handlebar of the cycle vehicle to orient the mirror stem in a plumb position. The threaded fasteners coupling the frame mounting bracket to the main frame and the handlebar mounting bracket to the frame mounting bracket may be loosened. Loosening these two fasteners facilitates rotation of the mounting brackets relative to one another and the main frame. The directions of rotation are substantially orthogonal to one another, ensuring that any rotational adjustment which places the top surface of the main frame in a substantially level orientation relative to the ground is possible. Leveling the top surface of the main frame also orients the mirror stem in a substantially plumb orientation (i.e. the extended axis of the mirror stem is perpendicular to the ground).

The method may also include an operation of receiving an engagement of the handle, the engagement of the handle rotating the mirror stem within the main frame and bearing cap from a first position to the second position, the orientation of the mounting brackets maintaining the mirror stem in a plumb position during rotation, the rotation of the mirror stem providing an operator of the cycle vehicle with a different mirror view via a mirror fixedly coupled to the mirror stem. An operator of the motorcycle may press the lever by hand without removing the hand from the handlebar of the motorcycle. As described above, the lever is fixedly coupled with the mirror stem, the mirror stem lockibly engaged with the spring carrier. The mirror stem and spring carrier are disposed within the main frame and bearing cap such that the arrangement of the handle, mirror stem and spring carrier rotate in tandem relative to the main frame and bearing cap. The operation of leveling the main frame ensures the mirror stem remains plumb during rotation, and the rotation swivels the mirror such that a view to the side of the motorcycle is provided, enabling a rider to see a blind spot without having to turn and look over the shoulder. The plumb mirror stem ensures that rotation does not result in the mirror drooping or being rotated into a crooked orientation, which would reduce the effectiveness of the new view. The operation of receiving the engagement of the handle pushes against the tension provided by a compression spring and spring bushing disposed between the spring carrier and the main frame.

The method may also include an operation of returning the mirror stem to the first position from the second position upon the handle being disengaged, the returning the mirror via a compression spring of the spring carrier arrangement tensionally biased against a portion of the main frame, the returning the mirror stem providing the operator of the cycle vehicle with an original mirror view via the mirror fixedly coupled to the mirror stem. Upon the rider releasing the handle, the compression spring expands, rotating the spring carrier and mirror stem back to their original position. Thus, the mirror is automatically returned to its home position upon releasing the handle.

While preferred and alternative embodiments of the invention have been illustrated and described, as noted above, many changes can be made without departing from the spirit and scope of the invention. Accordingly, the scope of the invention is not limited by the disclosure of these preferred and alternate embodiments. Instead, the invention should be determined entirely by reference to the claims that follow.

What is claimed is:

1. A broad view mirror for a cycle vehicle, comprising:
   a frame arrangement configured for receiving a mirror stem of a mirror;
   a spring carrier arrangement enabling the mirror to rotate responsive to an engagement of a handle coupled with a received mirror stem and spring carrier arrangement, the spring carrier arrangement enabling a mirror coupled to the received mirror stem to return to a home position when the handle is disengaged; and
   a mounting bracket arrangement configured for orienting a received mirror stem in a desired position relative to the cycle vehicle.

2. The broad view mirror for a cycle vehicle of claim 1, wherein the spring carrier arrangement enabling the mirror to rotate responsive to an engagement of a handle coupled with the mirror stem and spring carrier arrangement, the spring carrier arrangement enabling the mirror to return to a home position when the handle is disengaged comprises:
   a compression spring carrier arrangement enabling the mirror to rotate responsive to an engagement of a handle coupled with the mirror stem and spring carrier arrangement, the compression spring carrier arrangement enabling the mirror to return to a home position when the handle is disengaged.

3. The broad view mirror for a cycle vehicle of claim 1, wherein the spring carrier arrangement enabling the mirror to rotate responsive to an engagement of a handle coupled with the mirror stem and spring carrier arrangement, the spring carrier arrangement enabling the mirror to return to a home position when the handle is disengaged comprises:
   a torsion spring carrier arrangement enabling the mirror to rotate responsive to an engagement of a handle coupled with the mirror stem and spring carrier arrangement, the torsion spring carrier arrangement enabling the mirror to return to a home position when the handle is disengaged.

4. The broad view mirror for a cycle vehicle of claim 3, wherein the torsion spring carrier arrangement enabling the mirror to rotate responsive to an engagement of a handle coupled with the mirror stem and spring carrier arrangement, the torsion spring carrier arrangement enabling the mirror to return to a home position when the handle is disengaged comprises:
   a torsion spring;
   a main frame including at least a groove for receiving a portion of the torsion spring;
   a torsion spring carrier including at least a portion capable of being disposed through the torsion spring, the torsion spring carrier including a notch for receiving a portion of the torsion spring; and
   a bearing cap.

5. The broad view mirror for a cycle vehicle of claim 1, further comprising:
   a rounded tube handle;
   a lever link, the lever link including at least a channel configured for receiving the mirror stem; and
   a means for rotatably affixing the rounded tube handle to the lever link.

6. The broad view mirror for a cycle vehicle of claim 5, wherein the means for rotatably affixing the rounded tube handle to the lever link comprises:
   means for enabling the rounded tube handle to articulate relative to the lever link.

7. The broad view mirror for a cycle vehicle of claim 1, further comprising:
   a tie rod lever link, the tie rod lever link coupled with the mounting bracket arrangement;
   a tie rod link, the tie rod link coupled with the mirror stem; and
   a tie rod coupling the tie rod lever link and the tie rod link.

8. The broad view mirror for a cycle vehicle of claim 7, wherein the tie rod coupling the tie rod lever link and the tie rod link comprises:
   an adjustable length tie rod coupling the tie rod lever link and the tie rod link.

9. The broad view mirror for a cycle vehicle of claim 8, wherein the adjustable length tie rod coupling the tie rod lever link and the tie rod link comprises:
   an internal rod including at least a threaded portion on one end of the internal rod; and
   at least one threadably removable tie rod link threaded onto the threaded portion of the internal rod.

10. The broad view mirror for a cycle vehicle of claim 1, wherein the frame arrangement comprises:
   a main frame; and
   a bearing cap,
   wherein the spring carrier arrangement is sandwiched between the main frame and the bearing cap.

11. The broad view mirror for a cycle vehicle of claim 1, further comprising:
   a mirror, the mirror being coupled with a mirror stem.

12. The broad view mirror for a cycle vehicle of claim 1, wherein the mirror comprises:
   at least one of a factory mirror, an original-equipment mirror, or an after-market mirror.

13. The broad view mirror for a cycle vehicle of claim 1, wherein the spring carrier arrangement enabling the mirror to rotate responsive to an engagement of a handle coupled with the mirror stem and spring carrier arrangement, the spring carrier arrangement enabling the mirror to return to a home position when the handle is disengaged comprises:
   a springless spring carrier arrangement including at least a rubber torsion bushing, the rubber torsion bushing enabling the mirror to rotate responsive to an engagement of a handle coupled with the mirror stem and springless spring carrier arrangement, the rubber torsion bushing enabling the mirror to return to a home position when the handle is disengaged.

14. The broad view mirror for a cycle vehicle of claim 1, wherein the mounting bracket arrangement configured for orienting a received mirror stem in a desired position relative to the cycle vehicle comprises:
   a frame mounting bracket coupled with the spring carrier arrangement;
   a handlebar mounting bracket coupled with the frame mounting bracket; and
   a mounting bolt, the mounting bolt passed through an aperture associated with a handlebar of the cycle vehicle and passed through the handlebar mounting bracket, the handlebar mounting bracket secured to the handlebar of the cycle vehicle with a threaded fastener threaded onto the mounting bolt.

15. The broad view mirror for a cycle vehicle of claim 14, wherein the handlebar mounting bracket coupled with the frame mounting bracket comprises:
   the handlebar mounting bracket adjustably rotatably coupled with the frame mounting bracket.

16. The broad view mirror for a cycle vehicle of claim 14, wherein the frame mounting bracket coupled with the spring carrier arrangement comprises:
   the frame mounting bracket adjustably rotatably coupled with the spring carrier arrangement.

17. The broad view mirror for a cycle vehicle of claim 1, wherein a limit of rotation of the received mirror stem is defined by a portion of the spring carrier engaging a portion of the main frame.

18. The broad view mirror for a cycle vehicle of claim 1, wherein the spring carrier arrangement tensionally biases the mirror stem to at least one of a first position or a home position for the mirror stem, and wherein engagement of the handle facilitates rotation of the mirror stem against the tensional bias of the mirror stem to a second position for the mirror stem, the second position defined by a flat portion of the spring carrier engaging a portion of the main frame, and wherein the handle being released permits the tensional bias of the spring carrier arrangement to return the mirror stem to the home position for the mirror stem.

19. A broad view mirror for a cycle vehicle, comprising:
   a mirror including at least a mirror stem;
   a frame arrangement configured for receiving the mirror stem of the mirror;
   a spring carrier arrangement enabling the mirror to rotate responsive to an engagement of a handle coupled with the received mirror stem and spring carrier arrangement, the spring carrier arrangement enabling a rotated mirror return to a home position when the handle is disengaged; and
   a mounting bracket arrangement configured for orienting a received mirror stem in a desired position relative to the cycle vehicle.

20. A broad view mirror for a cycle vehicle, comprising:
   a mirror including at least a mirror stem;
   a frame arrangement configured for receiving the mirror stem of the mirror;
   a spring carrier arrangement enabling the mirror to rotate responsive to an engagement of a handle coupled with the received mirror stem and spring carrier arrangement, the spring carrier arrangement enabling a rotated mirror return to a home position when the handle is disengaged; and a mounting bracket arrangement configured for rotation of the broad view mirror relative to the cycle vehicle in at least two axes.

* * * * *